US012671115B2

(12) United States Patent
Matsumoto et al.

(10) Patent No.: US 12,671,115 B2
(45) Date of Patent: Jun. 30, 2026

(54) SECONDARY BATTERY

(71) Applicant: MURATA MANUFACTURING CO., LTD., Kyoto (JP)

(72) Inventors: Ryuhei Matsumoto, Kyoto (JP); Hideaki Kuwajima, Kyoto (JP); Toshikazu Yasuda, Kyoto (JP); Yuri Nakayama, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 567 days.

(21) Appl. No.: 18/124,170

(22) Filed: Mar. 21, 2023

(65) Prior Publication Data

US 2023/0231198 A1 Jul. 20, 2023

Related U.S. Application Data

(63) Continuation of application No. PCT/JP2021/033033, filed on Sep. 8, 2021.

(30) Foreign Application Priority Data

Oct. 8, 2020 (JP) ............................ JP2020-170718

(51) Int. Cl.

| | |
|---|---|
| ***H01M 10/0568*** | (2010.01) |
| ***H01M 4/02*** | (2006.01) |
| ***H01M 4/38*** | (2006.01) |
| ***H01M 10/0525*** | (2010.01) |
| ***H01M 10/0567*** | (2010.01) |
| ***H01M 10/0569*** | (2010.01) |

(52) U.S. Cl.

CPC ....... *H01M 10/0568* (2013.01); *H01M 4/382* (2013.01); *H01M 10/0525* (2013.01); *H01M 10/0567* (2013.01); *H01M 2004/027* (2013.01); *H01M 10/0569* (2013.01); *H01M 2300/0028* (2013.01)

(58) Field of Classification Search

None

See application file for complete search history.

(56) References Cited

U.S. PATENT DOCUMENTS

2005/0147886 A1 7/2005 Mikhaylik
2005/0156575 A1 7/2005 Mikhaylik
2008/0026296 A1 1/2008 Bowden et al.
2014/0242474 A1 8/2014 Matsui et al.

(Continued)

FOREIGN PATENT DOCUMENTS

CN 102017273 A 4/2011
CN 110520431 A 11/2019

(Continued)

OTHER PUBLICATIONS

Kawaji et al., WO 2019021522 A1, English Translation from FIT, 14 pages (Year: 2019).*

(Continued)

*Primary Examiner* — Colin W. Slifka

(74) *Attorney, Agent, or Firm* — K&L Gates LLP

(57) ABSTRACT

A secondary battery is provided and including a positive electrode, a negative electrode, and an electrolytic solution, where the negative electrode is metal lithium, and the electrolytic solution contains a sulfonyl group-containing lithium salt; a glyme-based solvent; and a specific additive.

14 Claims, 11 Drawing Sheets

(56) References Cited

U.S. PATENT DOCUMENTS

| | | | |
|---|---|---|---|
| 2016/0351878 A1 | 12/2016 | Visco et al. |
| 2017/0214053 A1 | 7/2017 | Kim et al. |
| 2018/0166743 A1 | 6/2018 | Lee et al. |
| 2018/0277913 A1 | 9/2018 | Pan et al. |

FOREIGN PATENT DOCUMENTS

| | | | | |
|---|---|---|---|---|
| JP | 2009544136 A | | 12/2009 | |
| JP | 2014067587 A | | 4/2014 | |
| JP | 2019527454 A | | 9/2019 | |
| JP | 2020017362 A | | 1/2020 | |
| JP | 2020511765 A | | 4/2020 | |
| WO | 2013157189 A1 | | 10/2013 | |
| WO | WO-2019021522 A1 | * | 1/2019 | .......... H01M 10/056 |

OTHER PUBLICATIONS

Japanese Office Action issued Mar. 26, 2024 in corresponding Japanese Application No. 2022-555321.

Office Action issued for corresponding Chinese Patent Application No. 202180067405.5, dated Oct. 28, 2025. (5 pages.).

Search Report issued for corresponding Chinese Patent Application No. 202180067405.5, dated Oct. 27, 2025. (3 pages.).

International Search Report of corresponding PCT application PCT/JP2021/033033, dated Oct. 19, 2021.

Office Action issued for corresponding Chinese Patent Application No. 202180067405.5, dated Apr. 23, 2026. (5 pages.).

* cited by examiner

EXAMPLE 8

EXAMPLE 9

EXAMPLE 10

EXAMPLE 11

EXAMPLE 12

EXAMPLE 13

COMPARATIVE EXMAPLE 1

COMPARATIVE EXMAPLE 2

SECONDARY BATTERY

CROSS REFERENCE TO RELATED APPLICATIONS

The present application is a continuation of PCT patent application no. PCT/JP2021/033033, filed on Sep. 8, 2021, which claims priority to Japanese patent application no. JP2020-170718, filed on Oct. 8, 2020, the entire contents of which are being incorporated herein by reference.

BACKGROUND

The present application relates to a secondary battery.

Conventionally, secondary batteries have a structure in which a positive electrode, a negative electrode, a separator, and a non-aqueous electrolytic solution are sealed in an exterior body. For such secondary batteries, attempts have been made to use a metal lithium electrode for the negative electrode from the viewpoint of increasing the battery capacity, but problems are caused, such as generation of dendrites and degradation of cycle characteristics.

Thus, for the purpose of inhibiting dendrites and improving cycle characteristics in secondary batteries with metal lithium electrodes used, approaches for avoiding side reactions that can be caused due to direct contact between the lithium metal and electrolytic solutions have been proposed, and for example, the following techniques have been reported.

For example, Patent Documents 1 to 3 disclose therein techniques for forming a protective layer on the surface of a negative electrode (metal lithium) with the use of a silicon-containing compound, a ceramic, a sulfide, or a polymer.

In addition, for example, Patent Documents 4 to 5 disclose techniques for adding a lithium nitrate to a glyme electrolytic solution.

SUMMARY

The present application relates to a secondary battery.

However, conventional techniques, for example, cause the following problems:

(1) The overvoltage is increased in discharge, thus causing a problem that the energy density of the battery has to be set to be low; and (2) Adequate cycle characteristics fail to be obtained in repeated charge-discharge.

The present application, in an embodiment, relates to providing a secondary battery that suppresses an overvoltage more sufficiently.

The present application, in another embodiment, relates to providing a secondary battery that suppresses an overvoltage more sufficiently and has more sufficiently excellent cycle characteristics.

The present application, in an embodiment, relates to:

a secondary battery including a positive electrode, a negative electrode, and an electrolytic solution, where the negative electrode is a metal lithium electrode, and the electrolytic solution includes:

a sulfonyl group-containing lithium salt;

a glyme-based solvent; and one or more additives selected from the group consisting of compounds represented by the following general formulas (I) to (V) and a lithium bis(oxalate)borate:

[Chemical Formula 1]

(I)

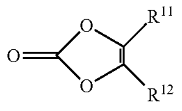

(in the formula (I), $R^{11}$ and $R^{12}$ are each independently a hydrogen atom, a halogen atom, or a hydrocarbon group having 1 to 10 carbon atoms);

[Chemical Formula 2]

(II)

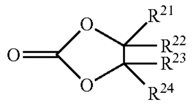

(in the formula (II), $R^{21}$, $R^{22}$, $R^{23}$, and $R^{24}$ are each independently a hydrogen atom, a halogen atom, or a hydrocarbon group having 1 to 10 carbon atoms);

[Chemical Formula 3]

$$NC-(CH_2)_m-CN \quad (III)$$

(in the formula (III), m is an integer of 1 or more and 10 or less);

[Chemical Formula 4]

(IV)

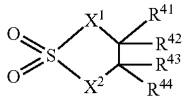

(in the formula (IV), $R^{41}$, $R^{42}$, $R^{43}$, and $R^{44}$ are each independently a hydrogen atom, a halogen atom, or a hydrocarbon group having 1 to 10 carbon atoms; and $X^1$ and $X^2$ are each independently an oxygen atom or a methylene group);

and

[Chemical Formula 5]

$$L_iR_h \quad (V)$$

(in the formula (V), Rh is a halogen atom).

The secondary battery, in an embodiment, according to the present application is capable of suppressing an overvoltage more sufficiently and is more sufficiently excellent in cycle characteristics.

DETAILED DESCRIPTION

Figure 1:
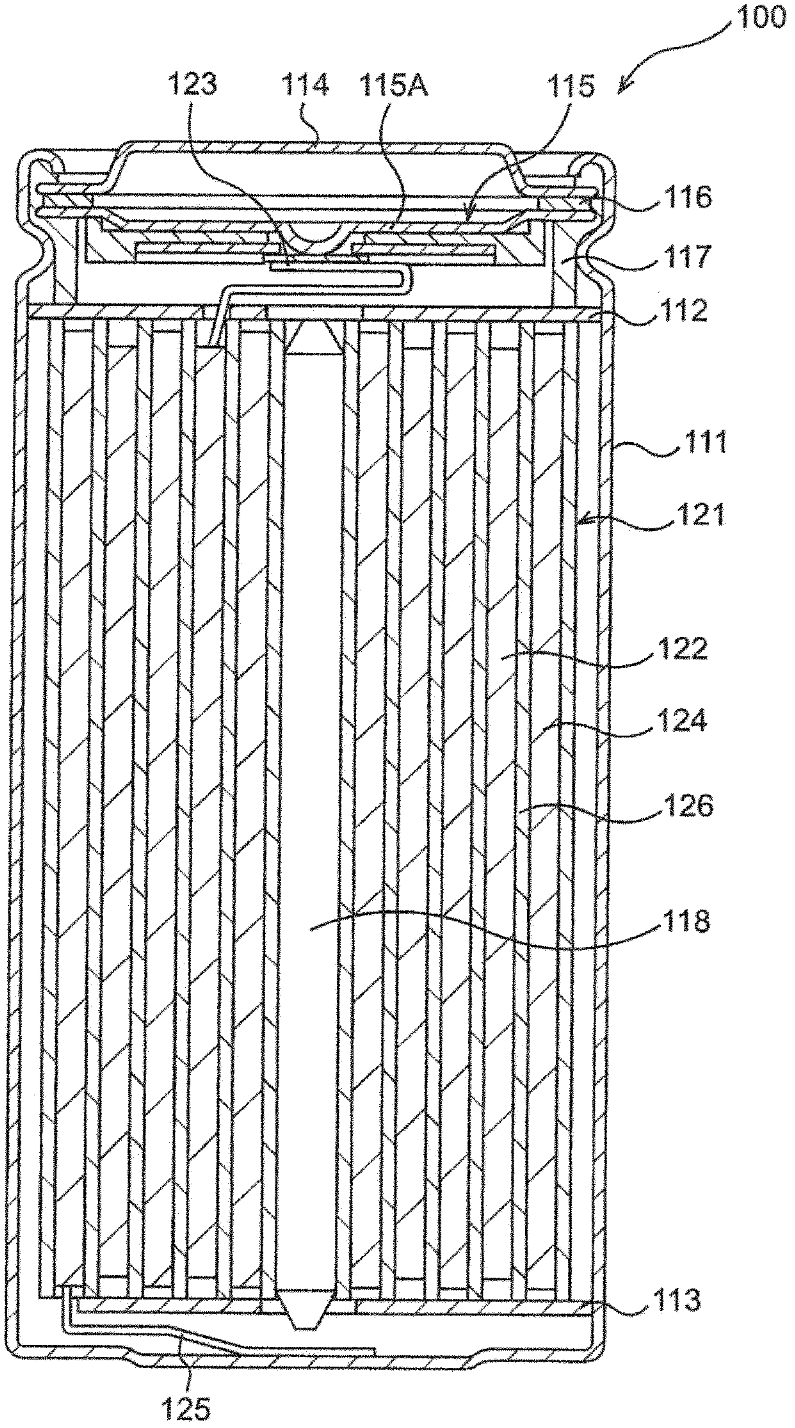
FIG. 1 is a schematic sectional view of a secondary battery (cylindrical secondary battery) provided as an embodiment of the present application.

The present application provides a secondary battery. In the present specification, the term "secondary battery" refers to a battery that can be repeatedly charged and discharged. The "secondary battery" is not excessively limited by its name and can include, for example, an electrochemical device such as a "power storage device".

The secondary battery according to the present application includes a positive electrode, a negative electrode, and an electrolytic solution, and typically further includes a separator disposed between the positive electrode and the negative electrode. For the secondary battery according to the present application, the positive electrode, the negative electrode, the electrolytic solution, the separator, and the like are typically enclosed in an exterior body.

The electrolytic solution is a non-aqueous electrolytic solution. The non-aqueous electrolytic solution means an electrolytic solution in which a medium in which electrolyte ions move does not contain water, that is, an electrolytic solution using only an organic solvent as a medium.

According to the present application, the electrolytic solution includes an electrolyte, a solvent, and a specific additive.

In the present application, the electrolyte of the electrolytic solution contains a sulfonyl group-containing lithium salt. When the electrolyte contains no sulfonyl group-containing lithium salt, the electrolyte is poor in ion conductivity.

The sulfonyl group-containing lithium salt is an organolithium salt containing a sulfonyl group ($-SO_2-$) in the molecular structure. Specific examples of the sulfonyl group-containing lithium salt include one or more compounds selected from the group consisting of sulfonylimide-based lithium salts represented by the following general formula (S1) and lithium sulfonate salts represented by the following general formula (S2). The sulfonyl group-containing lithium salt is preferably a sulfonylimide-based lithium salt represented by the following general formula (S1) from the viewpoint of further suppressing an overvoltage and further improving cycle characteristics. In the present specification, the suppression of the overvoltage means that the magnitude of the peak of the overvoltage (that is, the absolute value of the overvoltage) is reduced. Accordingly, for example, the initial charge-discharge curve measured in an example has an overvoltage more sufficiently suppressed with the increased read value of the voltage with respect to the peak top on the vertical axis (that is, the decreased downward peak).

[Chemical Formula 6]

(S1)

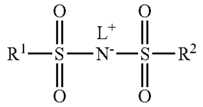

In the formula (S1), $R^1$ and $R^2$ are each independently a halogen atom or a halogen atom-containing hydrocarbon group having 1 to 10 carbon atoms, and from the viewpoint of further suppressing an overvoltage and further improving cycle characteristics, preferably a halogen atom or a halogen atom-containing hydrocarbon group having 1 to 5 carbon atoms, more preferably a halogen atom-containing hydrocarbon group having 1 to 3 carbon atoms. For $R^1$ and $R^2$, the halogen atom-containing hydrocarbon group is a monovalent hydrocarbon group, and may be a saturated aliphatic hydrocarbon group, an unsaturated aliphatic hydrocarbon group, or an aromatic hydrocarbon group as long as the group contains a halogen atom, and from the viewpoint of further suppressing an overvoltage and further improving cycle characteristics, a saturated aliphatic hydrocarbon group (alkyl group) is preferred. The number of halogen atoms contained in the halogen atom-containing hydrocarbon group is not particularly limited, as long as at least some hydrogen atoms of the hydrocarbon group are substituted with halogen atoms. For the halogen atom-containing hydrocarbon group, all of the hydrogen atoms of the hydrocarbon group are preferably substituted with halogen atoms from the viewpoint of further suppressing an overvoltage and further improving cycle characteristics. The halogen atom may be a fluorine atom, a chlorine atom, or a bromine atom, and a fluorine atom is preferred from the viewpoint of further suppressing an overvoltage and further improving cycle characteristics. When the halogen atom-containing hydrocarbon group is a saturated aliphatic hydrocarbon group, where all of the hydrogen atoms thereof are substituted with fluorine atoms, the halogen atom-containing hydrocarbon group may be referred to as a perfluoroalkyl group. Preferred halogen atom-containing hydrocarbon groups for $R^1$ and $R^2$ include a perfluoromethyl group, a perfluoroethyl group, a perfluoropropyl group, a perfluorobutyl group, and a perfluoropentyl group. $R^1$ and $R^2$ preferably represent the same group from the viewpoint of further suppressing an overvoltage and further improving cycle characteristics.

Examples of such a compound represented by the general formula (S1) (which may be referred to also as a compound (S1) or a sulfonylimide-based lithium salt (S1)) include the following compounds.

TABLE 1-S1

Specific Examples of Compound (S1)

| Compound | $R^1$ | $R^2$ |
|---|---|---|
| s1-1 | fluorine atom | fluorine atom |
| s1-2 | perfluoromethyl group | perfluoromethyl group |
| s1-3 | perfluoroethyl group | perfluoroethyl group |
| s1-4 | perfluoropropyl group | perfluoropropyl group |
| s1-5 | perfluorobutyl group | perfluorobutyl group |
| s1-6 | perfluoropentyl group | perfluoropentyl group |
| s1-7 | fluorine atom | perfluoromethyl group |
| s1-8 | fluorine atom | perfluoroethyl group |
| s1-9 | fluorine atom | perfluoropropyl group |
| s1-10 | fluorine atom | perfluorobutyl group |
| s1-11 | fluorine atom | perfluoropentyl group |
| s1-12 | perfluoromethyl group | perfluoroethyl group |
| s1-13 | perfluoromethyl group | perfluoropropyl group |
| s1-14 | perfluoromethyl group | perfluorobutyl group |
| s1-15 | perfluoromethyl group | perfluoropentyl group |

[Chemical Formula 7]

(S2)

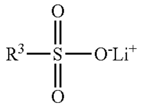

In the formula (S2), $R^3$ is a halogen atom or a halogen atom-containing hydrocarbon group having 1 to 10 carbon atoms, and from the viewpoint of further suppressing an overvoltage and further improving cycle characteristics, preferably a halogen atom or a halogen atom-containing hydrocarbon group having 1 to 5 carbon atoms, more preferably a halogen atom-containing hydrocarbon group having 1 to 3 carbon atoms. For $R^3$, the halogen atom-containing hydrocarbon group, which is the same as the halogen atom-containing hydrocarbon group for $R^1$ and $R^2$, is a monovalent hydrocarbon group, and may be a saturated aliphatic hydrocarbon group, an unsaturated aliphatic hydrocarbon group, or an aromatic hydrocarbon group as long as the group contains a halogen atom, and from the viewpoint of further suppressing an overvoltage and further improving cycle characteristics, a saturated aliphatic hydrocarbon group (alkyl group) is preferred. The number of halogen atoms contained in the halogen atom-containing hydrocarbon group is not particularly limited, as long as at least some hydrogen atoms of the hydrocarbon group are substituted with halogen atoms. For the halogen atom-containing hydrocarbon group, all of the hydrogen atoms of the hydrocarbon group are preferably substituted with halogen atoms from the viewpoint of further suppressing an overvoltage and further improving cycle characteristics. The halogen atom may be a fluorine atom, a chlorine atom, or a bromine atom, and a fluorine atom is preferred from the viewpoint of further suppressing an overvoltage and further improving cycle characteristics. When the halogen atom-containing hydrocarbon group is a saturated aliphatic hydrocarbon group, where all of the hydrogen atoms thereof are substituted with fluorine atoms, the halogen atom-containing hydrocarbon group may be referred to as a perfluoroalkyl group. Preferred halogen atom-containing hydrocarbon groups for $R^3$ include the same groups as the preferred halogen atom-containing hydrocarbon groups for $R^1$ and $R^2$.

Examples of such a compound represented by the general formula (S2) (which may be referred to also as a compound (S2) or a lithium sulfonate salt (S2)) include the following compounds.

TABLE 1-S2

Specific Examples of Compound (S2)

| Compound | $R^3$ |
|---|---|
| s2-1 | Fluorine Atom |
| s2-2 | perfluoromethyl group |
| s2-3 | perfluoroethyl group |
| s2-4 | perfluoropropyl group |
| s2-5 | perfluorobutyl group |
| s2-6 | perfluoropentyl group |

The sulfonyl group-containing lithium salt is available as a commercial product.

For example, the compound (s1-1) is available as LiFSI (manufactured by NIPPON SHOKUBAI CO., LTD.).

In addition, for example, the compound (s1-2) is available as LiTFSI (manufactured by Tomiyama Pure Chemical Industries, Ltd.).

In addition, for example, the compound (s1-3) is available as LiBETI (manufactured by Tokyo Chemical Industry Co., Ltd.).

In addition, for example, the compound (s1-5) is available as $LiN(SO_2C_4F_9)_2$ (manufactured by Tomiyama Pure Chemical Industries, Ltd.).

In addition, for example, the compound (s2-2) is available as $LiCF_3SO_3$ (manufactured by Tomiyama Pure Chemical Industries, Ltd.).

In addition, for example, the compound (s2-5) is available as $LiC_4F_9SO_3$ (manufactured by Tomiyama Pure Chemical Industries, Ltd.).

The content of the sulfonyl group-containing lithium salt is not particularly limited, and is preferably 0.1 mol/L or more and 10 mol/L or less, more preferably 0.1 mol/L or more and 5 mol/L or less, still more preferably 0.5 mol/L or more and 3 mol/L or less from the viewpoint of further suppressing an overvoltage and further improving cycle characteristics. The sulfonyl group-containing lithium salt may contain two or more types of compounds that differ in structure, and in that case, the total content thereof may fall within the range mentioned above. It is to be noted that the unit "mol/L" means the number of moles contained in the total amount 1 L of the electrolytic solution.

The present application is not intended to prevent the electrolytic solution from containing an electrolyte (hereinafter, which may be referred to as another electrolyte) besides the sulfonyl group-containing lithium salt. The content of the other electrolyte is typically equal to or less than the content of the sulfonyl group-containing lithium salt, and may be, for example, 5 mol/L or less, particularly 0.5 mol/L or less. The content of the other electrolyte is, from the viewpoint of further suppressing an overvoltage and further improving cycle characteristics, preferably as low as possible, and more preferably 0 mol/L.

In the present application, the solvent of the electrolytic solution includes a glyme-based solvent as a main solvent.

The glyme-based solvent may be any solvent used as a glyme-based solvent in the field of secondary batteries. Examples of the glyme-based solvent include one or more compounds selected from the group consisting of linear ethers represented by the following general formula (G). The "linear ether" referred to in the present application means that at least a site of the ethyleneoxy structural unit is not branched (that is, having no branched structure). Thus, R' and R" in the following general formula (G) do not necessarily have to have a linear structure, and may have a branched structure. In a certain preferred aspect, the linear ether for use in the electrolytic solution in the present application is a glycol-based ether in which not only the site of the ethyleneoxy structural unit does not have a branched structure but also R' and R" have no branched structure.

[Chemical Formula 8]

$$R'\text{-}(O\text{—}C_2H_4)_n\text{-}O\text{—}R'' \quad (G)$$

In the formula (G), R' and R" are each independently a hydrocarbon group having 1 to 10 carbon atoms, and from the viewpoint of further suppressing an overvoltage and further improving cycle characteristics, preferably a hydrocarbon group having 1 to 5 carbon atoms, more preferably a hydrocarbon group having 1 to 3 carbon atoms. For R' and R", the hydrocarbon group is a monovalent hydrocarbon group, and may be a saturated aliphatic hydrocarbon group, an unsaturated aliphatic hydrocarbon group, or an aromatic hydrocarbon group, and from the viewpoint of further suppressing an overvoltage and further improving cycle characteristics, a saturated aliphatic hydrocarbon group (alkyl group) is preferred. Preferred hydrocarbon groups for R' and R" include a methyl group, an ethyl group, a propyl group, a butyl group, a pentyl group, a hexyl group, a heptyl group, an octyl group, a nonyl group, and a decyl group. R' and R" preferably represent the same group from the viewpoint of further suppressing an overvoltage and further improving cycle characteristics.

n is an integer of 1 or more and 10 or less, and from the viewpoint of further suppressing an overvoltage and further improving cycle characteristics, n is preferably an integer of 1 or more and 5 or less, more preferably an integer of 1 or more and 3 or less, still more preferably 1.

Preferred specific examples of such a glyme-based solvent include an ethylene glycol-based ether, a diethylene glycol-based ether, a triethylene glycol-based ether, and a tetraethylene glycol-based ether. From the viewpoint of further suppressing an overvoltage and further improving the cycle characteristics, an ethylene glycol-based ether (particularly, an ethylene glycol dimethyl ether (dimethoxyethane)) is preferred.

Examples of the ethylene glycol-based ether include the following compounds:

ethylene glycol dimethyl ether (dimethoxyethane), ethylene glycol ethyl-methyl ether, ethylene glycol methyl-propyl ether, ethylene glycol butyl-methyl ether, ethylene glycol methyl-pentyl ether, ethylene glycol methyl-hexyl ether, ethylene glycol methyl-heptyl ether, and ethylene glycol methyl-octyl ether;

ethylene glycol diethyl ether, ethylene glycol ethyl-propyl ether, ethylene glycol butyl-ethyl ether, ethylene glycol ethyl-pentyl ether, ethylene glycol ethyl-hexyl ether, ethylene glycol ethyl-heptyl ether, and ethylene glycol ethyl-octyl ether; and ethylene glycol dipropyl ether, ethylene glycol butyl-propyl ether, ethylene glycol propyl-pentyl ether, ethylene glycol propyl-hexyl ether, ethylene glycol propyl-heptyl ether, and ethylene glycol propyl-octyl ether.

Examples of the diethylene glycol-based ether include the following compounds:

diethylene glycol dimethyl ether, diethylene glycol ethyl-methyl ether (diglyme), diethylene glycol methyl-propyl ether, diethylene glycol butyl-methyl ether, diethylene glycol methyl-pentyl ether, diethylene glycol methyl-hexyl ether, diethylene glycol methyl-heptyl ether, and diethylene glycol methyl-octyl ether;

diethylene glycol diethyl ether, diethylene glycol ethyl-propyl ether, diethylene glycol butyl-ethyl ether, diethylene glycol ethyl-pentyl ether, diethylene glycol ethyl-hexyl ether, diethylene glycol ethyl-heptyl ether, and diethylene glycol ethyl-octyl ether; and diethylene glycol dipropyl ether, diethylene glycol butyl-propyl ether, diethylene glycol propyl-pentyl ether, diethylene glycol propyl-hexyl ether, diethylene glycol propyl-heptyl ether, and diethylene glycol propyl-octyl ether.

Examples of the triethylene glycol-based ether include the following compounds:

triethylene glycol dimethyl ether (triglyme), triethylene glycol ethyl-methyl ether, triethylene glycol methyl-propyl ether, triethylene glycol butyl-methyl ether, triethylene glycol methyl-pentyl ether, triethylene glycol methyl-hexyl ether, triethylene glycol methyl-heptyl ether, and triethylene glycol methyl-octyl ether;

triethylene glycol diethyl ether, triethylene glycol ethyl-propyl ether, triethylene glycol butyl-ethyl ether, triethylene glycol ethyl-pentyl ether, triethylene glycol ethyl-hexyl ether, triethylene glycol ethyl-heptyl ether, and triethylene glycol ethyl-octyl ether; and triethylene glycol dipropyl ether, triethylene glycol butyl-propyl ether, triethylene glycol propyl-pentyl ether, triethylene glycol propyl-hexyl ether, triethylene glycol propyl-heptyl ether, and triethylene glycol propyl-octyl ether.

Examples of the tetraethylene glycol-based ether include the following compounds:

tetraethylene glycol dimethyl ether (tetraglyme), tetraethylene glycol ethyl-methyl ether, tetraethylene glycol methyl-propyl ether, tetraethylene glycol butyl-methyl ether, tetraethylene glycol methyl-pentyl ether, tetraethylene glycol methyl-hexyl ether, tetraethylene glycol methyl-heptyl ether, and tetraethylene glycol methyl-octyl ether;

tetraethylene glycol diethyl ether, tetraethylene glycol ethyl-propyl ether, tetraethylene glycol butyl-ethyl ether, tetraethylene glycol ethyl-pentyl ether, tetraethylene glycol ethyl-hexyl ether, tetraethylene glycol ethyl-heptyl ether, and tetraethylene glycol ethyl-octyl ether; and tetraethylene glycol dipropyl ether, tetraethylene glycol butyl-propyl ether, tetraethylene glycol propyl-pentyl ether, tetraethylene glycol propyl-hexyl ether, tetraethylene glycol propyl-heptyl ether, and tetraethylene glycol propyl-octyl ether.

The glyme-based solvent is available as a commercial product.

For example, a dimethoxyethane is available from Tomiyama Pure Chemical Industries, Ltd.

In addition, for example, a diglyme is available from Tomiyama Pure Chemical Industries, Ltd.

In addition, for example, a triglyme is available from Tomiyama Pure Chemical Industries, Ltd.

In addition, for example, a tetraglyme is available from Tomiyama Pure Chemical Industries, Ltd.

The glyme-based solvent is included as a main solvent in the electrolytic solution. The content of the glyme-based solvent is typically 50% by weight or more with respect to the total amount of the electrolytic solution, and is preferably 60% by weight or more, more preferably 70% by weight or more from the viewpoint of further suppressing an overvoltage and further improving cycle characteristics. The upper limit of the content of the glyme-based solvent is not particularly limited, and for example, the content of the glyme-based solvent may be usually 95% by weight or less, particularly 90% by weight or less. The glyme-based solvent may include two or more types of glyme-based solvents that differ in structure, and in that case, the total content thereof may fall within the range mentioned above.

The present application is not intended to prevent the electrolytic solution from containing a solvent (hereinafter, which may be referred to as another solvent) besides the glyme-based solvent. The content of the other solvent is typically lower than the content of the glyme solvent, and is preferably 30% by weight or less, more preferably 5% by weight, still more preferably 3% by weight with respect to the total amount of the electrolytic solution from the viewpoint of further suppressing an overvoltage and further improving cycle characteristics. The content of the other solvent is, from the viewpoint of further suppressing an overvoltage and further improving cycle characteristics, preferably as low as possible, and more preferably 0% by weight.

The electrolytic solution according to the present application includes one or more additives selected from the group consisting of compounds represented by the following general formulas (I) to (V) and a lithium bis(oxalate)borate. In the present application, the electrolytic solution composed of the sulfonyl group-containing lithium salt and the glyme-based solvent contains therein the specific additive, thereby reducing the overvoltage at the time of precipitation and dissolution of the lithium metal at the negative electrode (that is, at the time of charge and discharge). In the present application, as described above, the addition of the specific additive in a small amount to the electrolytic solution allows the overvoltage to be simply reduced. This is effective in improving the energy density and cycle characteristics of the battery with the metal lithium battery used. The specific additive is typically dissolved in the electrolytic solution.

[Chemical Formula 9]

(I)

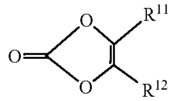

In the formula (I), $R^{11}$ and $R^{12}$ are each independently a hydrogen atom, a halogen atom, or a hydrocarbon group having 1 to 10 carbon atoms, and from the viewpoint of further suppressing an overvoltage and further improving cycle characteristics, preferably a hydrogen atom, a halogen atom, or a hydrocarbon group having 1 to 3 carbon atoms, more preferably a hydrogen atom or a halogen atom, still more preferably a hydrogen atom. For $R^{11}$ and $R^{12}$, the hydrocarbon group is a monovalent hydrocarbon group, and may be a saturated aliphatic hydrocarbon group, an unsaturated aliphatic hydrocarbon group, or an aromatic hydrocarbon group, and from the viewpoint of further suppressing an overvoltage and further improving cycle characteristics, a saturated aliphatic hydrocarbon group (alkyl group) is preferred. The halogen atom may be a fluorine atom, a chlorine atom, or a bromine atom, and a fluorine atom is preferred from the viewpoint of further suppressing an overvoltage and further improving cycle characteristics. $R^{11}$ and $R^{12}$ preferably represent the same group from the viewpoint of further suppressing an overvoltage and further improving cycle characteristics.

Examples of such a compound represented by the general formula (I) (which may be referred to also as a compound (I) or vinylene carbonates (I)) include the following compounds.

TABLE 2-1

| Specific Examples of Compound (I) | | |
|---|---|---|
| Compound | $R^{11}$ | $R^{12}$ |
| i-1 vinylene carbonate | hydrogen atom | hydrogen atom |
| i-2 | hydrogen atom | fluorine atom |
| i-3 | fluorine atom | fluorine atom |
| i-4 | hydrogen atom | methyl group |
| i-5 | methyl group | methyl group |

[Chemical Formula 10]

(II)

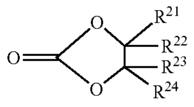

In the formula (II), $R^{21}$, $R^{22}$, $R^{23}$, and $R^{24}$ are each independently a hydrogen atom, or a halogen atom or a hydrocarbon group having 1 to 10 carbon atoms, and from the viewpoint of further suppressing an overvoltage and further improving cycle characteristics, preferably a hydrogen atom, a halogen atom, or a hydrocarbon group having 1 to 3 carbon atoms, more preferably a hydrogen atom or a halogen atom, still more preferably, $R^{21}$ and $R^{22}$ are hydrogen atoms, one of $R^{23}$ and $R^{24}$ is a hydrogen atom, and the other thereof is a halogen atom (particularly, a fluorine atom). For $R^{21}$, $R^{22}$, $R^{23}$, and $R^{24}$, the hydrocarbon group is a monovalent hydrocarbon group, and may be a saturated aliphatic hydrocarbon group, an unsaturated aliphatic hydrocarbon group, or an aromatic hydrocarbon group, and from the viewpoint of further suppressing an overvoltage and further improving cycle characteristics, a saturated aliphatic hydrocarbon group (alkyl group) is preferred. The halogen atom may be a fluorine atom, a chlorine atom, or a bromine atom, and a fluorine atom is preferred from the viewpoint of further suppressing an overvoltage and further improving cycle characteristics.

Examples of such a compound represented by the general formula (II) (which may be referred to also as a compound (II) or ethylene carbonates (II)) include the following compounds. Preferred compounds (II) contain halogen atoms, particularly fluorine atoms. The compound (II) containing a halogen atom is a compound where at least one group (particularly only one group) of $R^{21}$, $R^{22}$, $R^{23}$, and $R^{24}$ in the general formula (II) is a halogen atom, and such a compound may be referred to also as halogenated ethylene carbonates (II).

TABLE 2-11

| Specific Examples of Compound (II) | | | | |
|---|---|---|---|---|
| Compound | $R^{21}$ | $R^{22}$ | $R^{23}$ | $R^{24}$ |
| ii-1 | hydrogen atom | hydrogen atom | hydrogen atom | hydrogen atom |
| ii-2 | hydrogen atom | hydrogen atom | hydrogen atom | fluorine atom |
| ii-3 | hydrogen atom | fluorine atom | hydrogen atom | fluorine atom |
| ii-4 | fluorine atom | fluorine atom | hydrogen atom | fluorine atom |
| ii-5 | fluorine atom | fluorine atom | fluorine atom | fluorine atom |

[Chemical Formula 11]

$$NC\left(CH_2\right)_m CN \quad \text{(III)}$$

In the formula (III), m is an integer of 1 or more and 10 or less, and from the viewpoint of further suppressing an overvoltage and further improving the cycle characteristics, m is preferably an integer of 2 or more and 8 or less, more preferably an integer of 2 or more and 6 or less, still more preferably an integer of 3 or more and 5 or less.

Examples of such a compound represented by the general formula (III) (which may be referred to also as a compound (III) or adiponitriles (III)) include the following compounds.

TABLE 2-III

| Specific Examples of Compound (III) | |
|---|---|
| Compound | m |
| iii-1 | 1 |
| iii-2 | 2 |
| iii-3 | 3 |
| iii-4 (adiponitrile) | 4 |
| iii-5 | 5 |
| iii-6 | 6 |
| iii-7 | 7 |
| iii-8 | 8 |
| iii-9 | 9 |
| iii-10 | 10 |

[Chemical Formula 12]

(IV)

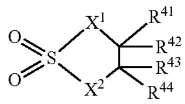

In the formula (IV), $R^{41}$, $R^{42}$, $R^{43}$, and $R^{44}$ are each independently a hydrogen atom, a halogen atom, or a hydrocarbon group having 1 to 10 carbon atoms, and from the viewpoint of further suppressing an overvoltage and further improving cycle characteristics, preferably a hydrogen atom, a halogen atom, or a hydrocarbon group having 1 to 3 carbon atoms, more preferably a hydrogen atom or a halogen atom, still more preferably, $R^{41}$, $R^{42}$, $R^{43}$, and $R^{44}$ are hydrogen atoms. For $R^{41}$, $R^{42}$, $R^{43}$, and $R^{44}$, the hydrocarbon group is a monovalent hydrocarbon group, and may be a saturated aliphatic hydrocarbon group, an unsaturated aliphatic hydrocarbon group, or an aromatic hydrocarbon group, and from the viewpoint of further suppressing an overvoltage and further improving cycle characteristics, a saturated aliphatic hydrocarbon group (alkyl group) is preferred. The halogen atom may be a fluorine atom, a chlorine atom, or a bromine atom, and a fluorine atom is preferred from the viewpoint of further suppressing an overvoltage and further improving cycle characteristics.

$X^1$ and $X^2$ are each independently an oxygen atom or a methylene group, and from the viewpoint of further suppressing an overvoltage and further improving cycle characteristics, preferably, at least one of $X^1$ and $X^2$ is an oxygen atom, more preferably, both $X^1$ and $X^2$ are oxygen atoms.

Examples of such a compound represented by the general formula (IV) (which may be referred to also as a compound (IV) or cyclic sulfonyl compounds (IV)) include the following compounds.

TABLE 2-IV

| Specific Examples of Compound (IV) | | | | | | |
|---|---|---|---|---|---|---|
| Compound | $R^{41}$ | $R^{42}$ | $R^{43}$ | $R^{44}$ | $X^1$ | $X^2$ |
| iv-1 (ethylene sulfate) | hydrogen atom | hydrogen atom | hydrogen atom | hydrogen atom | oxygen atom | oxygen atom |
| iv-2 | hydrogen atom | hydrogen atom | hydrogen atom | fluorine atom | oxygen atom | oxygen atom |
| iv-3 (sultone) | hydrogen atom | hydrogen atom | hydrogen atom | hydrogen atom | oxygen atom | methylene group |
| iv-4 | hydrogen atom | hydrogen atom | hydrogen atom | fluorine atom | oxygen atom | methylene group |
| iv-5 (sulfolane) | hydrogen atom | hydrogen atom | hydrogen atom | hydrogen atom | methylene group | methylene group |
| iv-6 | hydrogen atom | hydrogen atom | hydrogen atom | fluorine atom | methylene group | methylene group |

[Chemical Formula 13]

$$L_iR_h \quad \text{(V)}$$

In the formula (V), Rh is a halogen atom, and from the viewpoint of further suppressing an overvoltage and further improving cycle characteristics, Rh is preferably a fluorine atom or a chlorine atom, more preferably a fluorine atom. For Rh, the halogen atom may be a fluorine atom, a chlorine atom, or a bromine atom.

Examples of such a compound represented by the general formula (V) (which may be referred to also as a compound (V) or a lithium halide (V)) include the following compounds.

TABLE 2-V

| Specific Examples of Compound (V) | |
|---|---|
| Compound | Rh |
| v-1 | fluorine atom |
| v-2 | chorine atom |
| v-3 | bromine atom |
| v-4 | iodine atom |

The electrolytic solution preferably includes one or more selected from the following group A, more preferably includes one or more selected from the following group B, still more preferably include one or more selected from the following group C, particularly preferably includes one or more selected from the following group D, most preferably includes one or more selected from the following group E, for example, from the viewpoint of further suppressing an overvoltage and further improving cycle characteristics:

Group A: a group consisting of compounds represented by the general formulas (I), (II), (III), and (V) and a lithium bis(oxalate)borate;

Group B: a group consisting of compounds represented by the general formulas (I), (II), and (V) and a lithium bis(oxalate)borate;

Group C: a group consisting of compounds represented by the general formulas (I), (II), and (V) (particularly, Rh=chlorine atom);

Group D: a group consisting of compounds represented by the general formulas (II) and (V) (particularly, Rh=chlorine atom); and Group E: a group consisting of compounds represented by the general formula (II) and the formula (V) (particularly, Rh=chlorine atom).

The electrolytic solution preferably contains, for example, one or more selected from the group consisting of the compounds represented by the general formulas (I) and (II) and the compounds represented by general formula (V) (particularly LiF), from the viewpoint of balance between the further suppression of an overvoltage and the availability.

The content of the specific additive is not particularly limited, and is preferably 0.1 w/v % or more and 20 w/v % or less, more preferably 0.1 w/v % or more and 15 w/v % or less, still more preferably 0.5 w/v % or more and 15 w/v % or less, particularly preferably 1.5 w/v % or more and 12 w/v % or less, most preferably 1.5 w/v % or more and 10 w/v % or less from the viewpoint of further suppressing an overvoltage and further improving cycle characteristics. The specific additive may contain two or more types of compounds that differ in structure, and in that case, the total content thereof may fall within the range mentioned above. It is to be noted that the unit "w/v %" means the number of grams contained in the total amount 100 mL of the electrolytic solution.

The preferred content of the specific additive may vary depending on the type.

For example, when the electrolytic solution contains the compound represented by the general formula (I) alone as the specific additive, the content of the additive is preferably 1.5 w/v % or more and 15 w/v % or less, more preferably 5 w/v % or more and 15 w/v % or less, still more preferably 8 w/v % or more and 12 w/v % or less from the viewpoint of further suppressing an overvoltage.

In addition, for example, when the electrolytic solution contains the compound represented by the general formula (II) alone as the specific additive, the content of the additive is preferably 0.1 w/v % or more and 20 w/v % or less, more preferably 0.5 w/v % or more and 15 w/v % or less, still more preferably 0.5 w/v % or more and 12 w/v % or less from the viewpoint of further suppressing an overvoltage.

In addition, for example, when the electrolytic solution contains the compound represented by the general formula (III) alone as the specific additive, the content of the additive is preferably 1.5 w/v % or more and 15 w/v % or less, more preferably 5 w/v % or more and 15 w/v % or less, still more preferably 8 w/v % or more and 12 w/v % or less from the viewpoint of further suppressing an overvoltage.

In addition, for example, when the electrolytic solution contains the lithium bis(oxalate)borate alone as the specific additive, the content of the additive is preferably 0.1 w/v % or more and 20 w/v % or less, more preferably 0.1 w/v % or more and 10 w/v % or less, still more preferably 0.5 w/v % or more and 5 w/v % or less from the viewpoint of further suppressing an overvoltage.

In addition, for example, when the electrolytic solution contains the compound represented by the general formula (V) alone as the specific additive, the content of the additive is preferably 0.1 w/v % or more and 20 w/v % or less, more preferably 0.5 w/v % or more and 15 w/v % or less, still more preferably 0.5 w/v % or more and 8 w/v % or less, particularly preferably 0.5 w/v % or more and 6 w/v % or less, from the viewpoint of further suppressing an overvoltage. In this case, for example, when the compound represented by the general formula (V) is a lithium chloride alone, the content thereof preferably fall within the range mentioned above, from the viewpoint of further suppressing an overvoltage. In addition, for example, when the compound represented by the general formula (V) is a lithium fluoride alone, the content thereof is most preferably 1.5 w/v % or more and 6 w/v % or less, particularly 1.5 w/v % or more and 4 w/v % or less from the viewpoint of further suppressing an overvoltage.

The present application is not intended to prevent the electrolytic solution from containing an additive (hereinafter, which may be referred to as another additive) besides the specific additive mentioned above. The content of the other additive is typically lower than the content of the specific additive, and may be, for example, 5 w/v % or less, particularly 0.5 w/v % or less. The content of the other additive is, from the viewpoint of further suppressing an overvoltage and further improving cycle characteristics, preferably as low as possible, and more preferably 0 w/v %.

The electrolytic solution can be obtained by mixing and stirring at least the electrolyte, solvent, and specific additive mentioned above.

The positive electrode and the negative electrode are electrodes capable of occluding and releasing lithium ions. Thus, secondary battery according to the present application is a secondary battery that is charged and discharged by movements of lithium ions between the positive electrode and the negative electrode through the electrolytic solution. The secondary battery according to the present application has lithium ions are involved in charge-discharge, and thus corresponds to a so-called "lithium ion battery".

The positive electrode is not particularly limited as long as the electrode is capable of occluding and releasing lithium ions, and may be, for example, an electrode including at least a positive electrode layer and a positive electrode current collector (foil).

For the positive electrode, the positive electrode layer is provided on at least one surface of the positive electrode current collector. In this case, for example, for the positive electrode, the positive electrode layer may be provided on both surfaces of the positive electrode current collector, or the positive electrode layer may be provided on one surface of the positive electrode current collector. For the positive electrode, which is preferable from the viewpoint of further increasing the capacity of the secondary battery, the positive electrode layer is provided on both surfaces of the positive electrode current collector.

The positive electrode layer contains a positive electrode active material. The positive electrode active material is made of, for example, a granular material, and a binder is preferably included in the positive electrode layer for sufficient contact between particles and shape retention. Furthermore, it is also preferable that a conductive auxiliary agent is contained in the positive electrode layer in order to facilitate transfer of electrons promoting the battery reaction. As described above, because multiple components are contained, the positive electrode layer can be referred to also as a "positive electrode mixture layer" or the like.

The positive electrode active material is a substance that contributes to occlusion and release of lithium ions. From such a viewpoint, the positive electrode active material preferably contains, for example, one or more selected from the group consisting of sulfur and a lithium-containing composite oxides. The positive electrode active material may be contained singly or two or more kinds thereof may be contained in combination.

Examples of the sulfur include, for example, $S_8$ and/or a polymeric sulfur.

Examples of the lithium-containing composite oxide include a lithium-transition metal composite oxide containing lithium and at least one transition metal selected from the group consisting of cobalt, nickel, manganese, and iron. For example, the lithium-containing composite oxide may be a lithium cobaltate (LCO), a lithium nickelate, a lithium manganate, a lithium titanate (LTO), or an oxide obtained by replacing a part of these transition metals with another metal.

The binder that may be contained in the positive electrode layer is not particularly limited, and examples thereof include at least one selected from the group consisting of a polyvinylidene fluoride, a vinylidene fluoride-hexafluoropropylene copolymer, a vinylidene fluoride-tetrafluoroethylene copolymer, a polytetrafluoroethylene, a styrene-butadiene rubber, a carboxymethyl cellulose, and a polyacrylic acid, and the like. The conductive auxiliary agent that can be contained in the positive electrode layer is not particularly limited, and examples thereof include at least one selected from carbon black such as thermal black, furnace black, channel black, ketjen black, and acetylene black, metal powders such as copper, nickel, aluminum, and silver, and polyphenylene derivatives. In a more preferred embodiment, the binder of the positive electrode layer is polyvinylidene fluoride, and in another more preferable embodiment, the conductive auxiliary agent of the positive electrode layer is carbon black. In a further preferred embodiment, the binder and the conductive auxiliary agent of the positive electrode layer are a combination of polyvinylidene fluoride and carbon black.

The positive electrode current collector used for the positive electrode is a member contributing to the collection and supply of electrons generated in the active material by the battery reaction. Such a current collector may be a sheet-like metal member and may be in a porous or perforated form. For example, the current collector may be a metal foil, a punching metal, a net, an expanded metal, or the like. The positive electrode current collector used for the positive electrode is preferably made of a metal foil containing at least one selected from a group consisting of aluminum, stainless steel, nickel, and the like, and may be, for example, an aluminum foil.

The positive electrode preferably contains sulfur and/or a lithium titanate (LTO) from the viewpoint of further suppressing an overvoltage and further improving cycle characteristics, and in this case, the positive electrode has a positive electrode layer containing sulfur and/or a lithium titanate (LTO) and a positive electrode current collector (foil).

The positive electrode can be obtained by mixing a positive electrode active material, a binder, (and a conductive agent, if necessary), and the like together, adding an organic solvent to prepare a slurry, coating the slurry on a positive electrode current collector by an optional coating method, and drying the slurry.

The negative electrode is a metal lithium electrode, and the metal lithium is a substance that contributes to occlusion and release of lithium ions. The term "metal lithium electrode" refers, in a broad sense, to an electrode containing metal lithium (Li) as an active component (that is, a negative electrode active material). In a narrow sense, the term "metal lithium electrode" refers to an electrode containing lithium, for example, an electrode containing lithium metal or a lithium alloy, particularly a negative electrode of such metal lithium (for example, a simple substance of metal lithium). Although the metal lithium electrode may contain a component other than a lithium metal or lithium alloy, in a preferred embodiment, the lithium electrode is an electrode made of a metal body of lithium (for example, an electrode made of a single magnesium metal having a purity of 90% or more, preferably a purity of 95% or more, more preferably, a purity of 98% or more).

The negative electrode can be produced from, for example, a plate-like material or a foil-like material, but is not limited thereto, and can be formed (shaped) with the use of a powder.

The metal lithium electrode (negative electrode) may be supported by a negative electrode current collector and then used. For example, the metal lithium electrode may be formed on the negative electrode current collector. For the negative electrode current collector, a current collector (or metal foil) that is similar to the positive electrode current collector can be used. The negative electrode current collector is preferably a copper foil from the viewpoint of further suppressing an overvoltage and further improving cycle characteristics.

The positive electrode and the negative electrode are alternately disposed with the separator described later interposed therebetween. The positive electrode and the negative electrode may have, together with the separator described later, a flat stacked structure, a wound structure, or a stack-and-folding structure. Specifically, the secondary battery may have a flat stacked structure in which the positive electrode, the negative electrode, and the separator disposed between the positive electrode and the negative electrode are stacked in a planar form, a wound structure in which the positive electrode, the negative electrode, and the separator disposed between the positive electrode and the negative electrode are wound in a roll form, or a so-called stack-and-folding structure in which the positive electrode, the negative electrode, and the separator disposed between the positive electrode and the negative electrode are stacked and then folded.

The separator is a member provided from the viewpoint of preventing a short circuit due to contact between the positive and negative electrodes, holding the electrolytic solution, and the like. In other words, the separator can be considered as a member that allows ions to pass while preventing electronic contact between the positive electrode and the negative electrode. Preferably, the separator is a porous or microporous insulating member, and may have a membrane form due to its small thickness.

The separator may be an inorganic separator or an organic separator. Examples of the inorganic separator include a glass filter and a glass fiber. Examples of the organic separator include porous membranes of synthetic resins including a polytetrafluoroethylene, a polypropylene, and/or a polyethylene, and the organic separator may have a structure obtained by laminating two or more of the membranes. Above all, a porous membrane made of a polyolefin is preferred, because the membrane has the excellent effect of short-circuit prevention and can make an improvement in the safety of the battery by the shutdown effect.

The exterior body may be a flexible pouch (soft bag) or a hard case (hard housing).

When the exterior body is a flexible pouch, the flexible pouch is usually formed of a laminate film, and a periphery is heat-sealed to form a seal portion. As the laminate film, a film formed by laminating a metal foil and a polymer film is generally used, and specifically, a three-layer film composed of an outer layer polymer film/a metal foil/an inner layer polymer film is exemplified. The outer layer polymer film is for preventing damage to the metal foil due to permeation and contact of moisture and the like, and polymers such as polyamide and polyester can be suitably used. The metal foil is for preventing permeation of moisture and gas, and a foil of copper, aluminum, stainless steel, or the like can be suitably used. The inner layer polymer film is for protecting the metal foil from the electrolyte housed inside and for melt-sealing at the time of heat sealing, and polyolefin or acid-modified polyolefin can be suitably used. The thickness of the laminate film is not particularly limited, and may be, for example, 1 μm or more and 1 mm or less. When the exterior body is a flexible pouch, the exterior body is heat-sealed at a peripheral edge of the secondary battery in plan view.

When the exterior body is a hard case, the hard case is usually formed of a metal plate, and a periphery is irradiated with laser to form a sealing portion. As the metal plate, a metal material made from aluminum, nickel, iron, copper, stainless steel or the like is generally used. The thickness of the metal plate is not particularly limited, and is preferably, for example, 1 μm or more and 1 mm or less.

Hereinafter, specific examples of a cylindrical secondary battery and a flat laminate film-type secondary battery will be described.

FIG. 1 shows a schematic sectional view of a cylindrical secondary battery 100. In the secondary battery 100, an electrode structure 121 and a pair of insulating plates 112 and 113 are housed inside an electrode structure housing member 111 having a substantially hollow columnar shape. The electrode structure 121 can be produced, for example, by stacking a positive electrode 122 and a negative electrode 124 with a separator 126 interposed therebetween to obtain an electrode structure and then winding the electrode structure. The electrode structure housing member (for example, a battery can) 111 has a hollow structure in which one end is closed and the other end is open, and includes iron (Fe) and/or aluminum (Al). The pair of insulating plates 112 and 113 are disposed so as to sandwich the electrode structure 121 and extend perpendicularly to the winding peripheral face of the electrode structure 121. A battery lid 114, a safety valve mechanism 115, and a positive temperature coefficient element (PTC element) 116 are crimped to the open end portion of the electrode structure housing member 111 with a gasket 117 interposed therebetween, and the electrode structure housing member 111 is thus sealed. The battery lid 114 is fabricated using, for example, the same material as that for the electrode structure housing member 111. The safety valve mechanism 115 and the positive temperature coefficient element 116 are provided on the inner side of the battery lid 114, and the safety valve mechanism 115 is electrically connected to the battery lid 114 via the positive temperature coefficient element 116. In the safety valve mechanism 115, a disk plate 115A is reversed when the internal pressure is raised to a certain level or more by an internal short circuit, external heating and/or the like. As a result, the electrical connection between the battery lid 114 and the electrode structure 121 is disconnected. For preventing abnormal heat generation due to a large amount of current, the resistance of the positive temperature coefficient element 116 increases as the temperature rises. The gasket 117 is includes, for example, an insulating material. The surface of the gasket 117 may be coated with asphalt or the like.

A center pin 118 is inserted into the winding center of the electrode structure 121. However, the center pin 118 may not be inserted into the winding center. A positive electrode lead part 123 including a conductive material such as aluminum is connected to the positive electrode 122. Specifically, the positive electrode lead part 123 is attached to the positive electrode (for example, the positive electrode current collector). A negative electrode lead part 125 including a conductive material such as copper is connected to the negative electrode 124. Specifically, the negative electrode lead part 125 is attached to the negative electrode (for example, the negative electrode current collector). The negative electrode lead part 125 is welded to the electrode structure housing member 111 and is electrically connected to the electrode structure housing member 111. The positive electrode lead part 123 is welded to the safety valve mechanism 115 and is electrically connected to the battery lid 114. In the example illustrated in FIG. 1, the negative electrode lead part 125 is provided at one location (the outermost periphery of the wound electrode structure), but may be provided at two locations (the outermost periphery and innermost periphery of the wound electrode structure).

The electrode structure 121 is formed by stacking the positive electrode 122 and the negative electrode 124 with the separator 126 interposed therebetween. When the positive electrode is composed of a positive electrode layer and a positive electrode current collector (foil), the positive electrode layer is not formed in a region of the positive electrode (for example, the positive electrode current collector) to which the positive electrode lead part 123 is attached.

The secondary battery 100 can be manufactured, for example, based on the following procedure.

First, a positive electrode layer is formed on both surfaces of a positive electrode current collector to obtain a positive electrode. A material in the form of a metal lithium foil is cut out to obtain a negative electrode.

Subsequently, the positive electrode lead part 123 is attached to the positive electrode current collector by a welding method or the like. In addition, the negative electrode lead part 125 is attached to the negative electrode by a welding method or the like. Next, the positive electrode 122 and the negative electrode 124 are stacked with the separator 126 made of a microporous polyethylene film interposed therebetween and wound (more specifically, the electrode structure (that is, stacked structure) of positive electrode 122/separator 126/negative electrode 124/separator 126 is wound) to manufacture the electrode structure 121, and then a protective tape (not shown) is attached to the outermost periphery. Thereafter, the center pin 118 is inserted into a center of the electrode structure 121. Then, the electrode structure 121 is housed inside the electrode structure housing member 111 while the electrode structure 121 is sandwiched between the pair of insulating plates 112,113. In this case, a tip of the positive electrode lead part 123 is attached to the safety valve mechanism 115, and a tip of the negative electrode lead part 125 is attached to the electrode structure housing member 111 with the use of a welding method or the like. Thereafter, the electrolytic solution is injected based on the reduced pressure method to impregnate the separator 126 with the electrolytic solution. Subsequently, the battery lid 114, the safety valve mechanism 115, and the positive temperature coefficient element 116 are crimped at the opening end portion of the electrode structure housing member 111 with the gasket 117 interposed therebetween.

Figure 2:
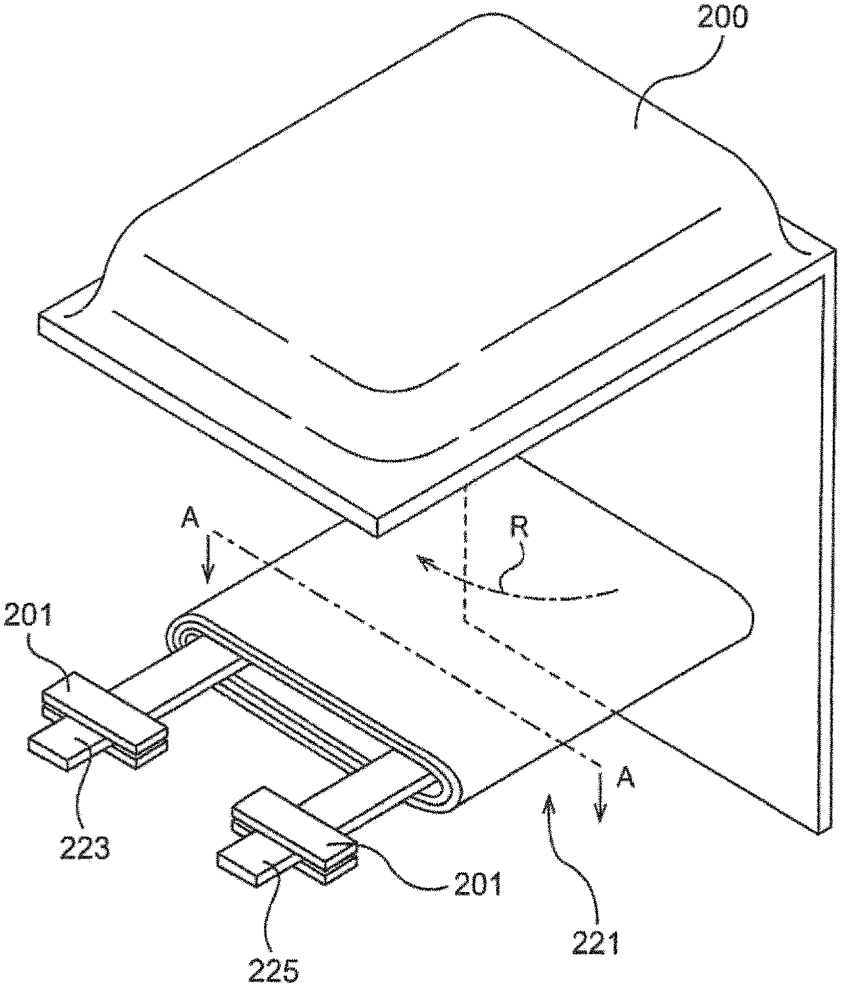
FIG. 2 is a schematic perspective view of a secondary battery (flat laminate film-type secondary battery) provided as an embodiment of the present application.

Next, a flat laminate film-type secondary battery will be described. FIG. 2 shows a schematic exploded perspective view of such a secondary battery. In this secondary battery, an electrode structure 221 basically similar to that described above is housed inside an exterior member 200 including a laminate film. The electrode structure 221 can be manufactured by stacking a positive electrode and a negative electrode with a separator interposed therebetween, and then winding this stacked structure. A positive electrode lead part 223 is attached to the positive electrode, and a negative electrode lead part 225 is attached to the negative electrode. The outermost periphery of the electrode structure 221 is protected by a protective tape. The positive electrode lead part 223 and the negative electrode lead part 225 protrude in the same direction from the inside to the outside of the exterior member 200. The positive electrode lead part 223 is formed of a conductive material such as aluminum. The negative electrode lead part 225 includes a conductive material such as copper, nickel, and/or stainless steel.

The exterior member 200 is a single film that is foldable in the direction of the arrow R illustrated in FIG. 2, and a recess (for example, emboss) for housing the electrode structure 221 is provided in a part of the exterior member 200. The exterior member 200 is, for example, a laminate film in which a fusion layer, a metal layer, and a surface protective layer are stacked in this order. In a step of manufacturing the secondary battery, the exterior member 200 is folded such that the fusion layers face each other with the electrode structure 221 interposed therebetween, and then the outer peripheral edges of the fusion layers are fused to each other. However, the exterior member 200 may be formed by bonding two separate laminate films to each other with an adhesive or the like interposed therebetween. The fusion layer includes, for example, a film of polyethylene and/or polypropylene. The metal layer includes, for example, an aluminum foil or the like. The surface protective layer includes, for example, nylon and/or polyethylene terephthalate. In particular, the exterior member 200 is preferably an aluminum laminate film that has a polyethylene film, an aluminum foil, and a nylon film laminated in this order. However, the exterior member 200 may be a laminate film that has another laminated structure, a polymer film such as a polypropylene, or a metal film. Specifically, the exterior member 200 may include a moisture-resistant aluminum laminate film that has a nylon film, an aluminum foil, and an unstretched polypropylene film laminated in this order from the outside.

A close contact film 201 is inserted between the exterior member 200 and the positive electrode lead part 223 and between the exterior member 200 and the negative electrode lead part 225 in order to prevent the intrusion of outside air. The close contact film 201 may be formed of a material exhibiting close contact property to the positive electrode lead part 223 and the negative electrode lead part 225, for example, a polyolefin resin or the like, more specifically, a polyolefin resin such as polyethylene, polypropylene, modified polyethylene, or modified polypropylene.

EXAMPLES

[Experimental Example 1] (Preparation of Half-Cell and Evaluation of Overvoltage in Discharge)

(Reagent)

The following reagents were used.

- LiTFSI (lithium bistrifluoromethanesulfonylimide): manufactured by Tomiyama Pure Chemical Industries, Ltd.
- Dimethoxyethane (DME): manufactured by Tomiyama Pure Chemical Industries, Ltd.
- Fluoroethylene carbonate (FEC): Tomiyama Pure Chemical Industries, Ltd.
- Vinylene carbonate (VC): manufactured by Tomiyama Pure Chemical Industries, Ltd.
- Adiponitrile (AdpN): manufactured by Tomiyama Pure Chemical Industries, Ltd.
- Ethylene sulfate (DTD): Tokyo Chemical Industry Co., Ltd.
- Lithium chloride: KISHIDA CHEMICAL CO., LTD.
- Lithium fluoride: Kojundo Chemical Lab. Co., Ltd.
- Lithium bis(oxalate)borate (LiBOB): Rockwood Lithium

Example 1

Preparation of Electrolytic Solution

In 1 L of dimethoxyethane (DME), a LiTFSI (lithium bistrifluoromethanesulfonylimide) as an electrolyte and a fluoroethylene carbonate (FEC) as an additive were dissolved respectively so as to be 1 mol/L and 1 w/v %, thereby providing an electrolytic solution.

Preparation of Li Half-Cell

Figure 3:
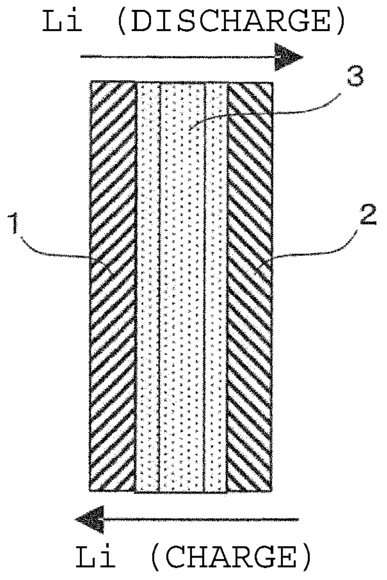
FIG. 3 is a schematic configuration diagram of a half-cell manufactured according to an example.

A Li foil (diameter=16 mm, purity 99.9%) of 1 mm in thickness was used for a working electrode, and a copper foil (diameter=15 mm, purity 99.9%) of 10 μm in thickness was used for a counter electrode. In addition, a polyolefin of 20 μm (diameter=19 mm) in thickness was used for a separator. With the use of CR 2016 for a coin can, as shown in FIG. 3, the working electrode (negative electrode) 1, the counter electrode (positive electrode) 2, and the separator 3 disposed therebetween was sandwiched, an electrolytic solution was injected, and crimping was performed to prepare a Li half-cell. FIG. 3 is a schematic configuration diagram of the half-cell manufactured according to the example.

Electrochemical Measurement

Figure 4:
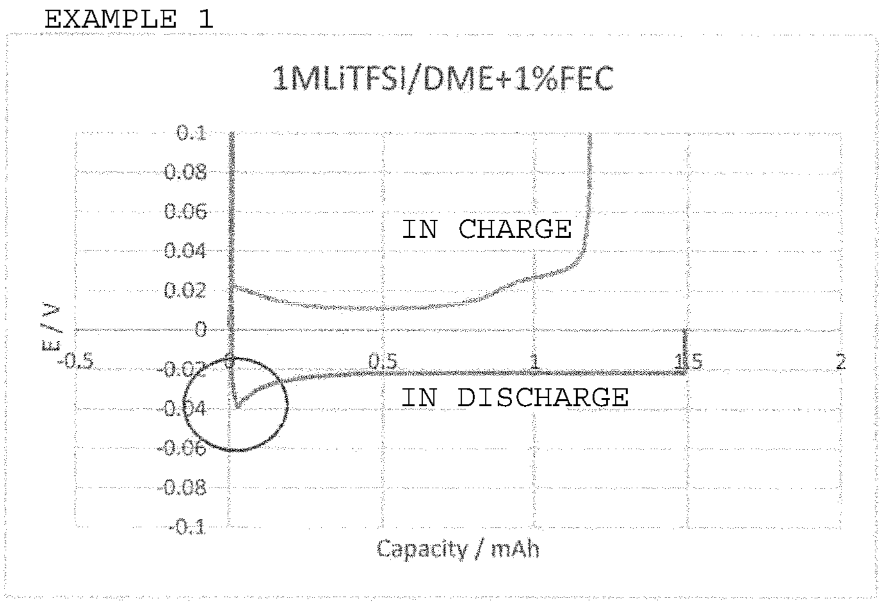
FIG. 4 is a graph showing an initial charge-discharge curve created in Example 1.

Discharge (that is, a reaction of precipitating Li on Cu) was performed at a constant current of 0.5 mA for 3 hours. Thereafter, charge (that is, a reaction of dissolving the Li precipitated on Cu) was performed at a constant current of 0.5 mA, and the charge cutoff potential was set to be 1.0 V. The initial charge-discharge curve in this case was created, and are shown in FIG. 4. In FIG. 4, the peak voltage in the discharge was measured, and defined as an overvoltage.

⊙; −0.04≤over voltage (best);

○; −0.05≤overvoltage<−0.04 (good);

Δ: −0.10<overvoltage≤−0.05 (pass: no problem in practical use); and

X: overvoltage<−0.10 (failure: problem in practical use)

Example 2

In the same manner as in Example 1 except that a vinylene carbonate (VC) was added as an additive so as to be 1 w/v %, an electrolytic solution was prepared, a Li half-cell was prepared, the electrochemical measurement was performed, and an initial charge-discharge curve (FIG. 5) was created.

Figure 5:
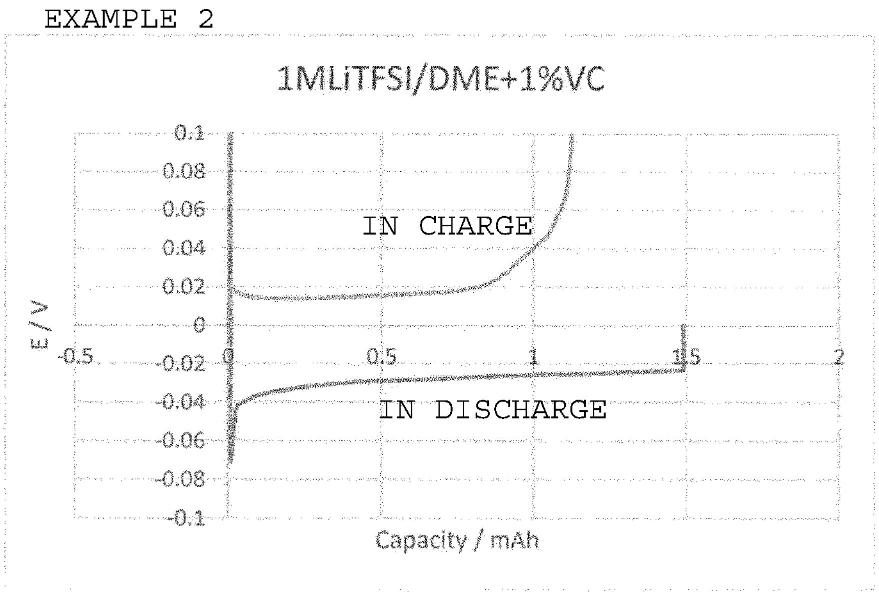
FIG. 5 is a graph showing an initial charge-discharge curve created in Example 2.

In FIG. 5, the peak voltage in the discharge was measured, and defined as an overvoltage.

Example 3

Figure 6:
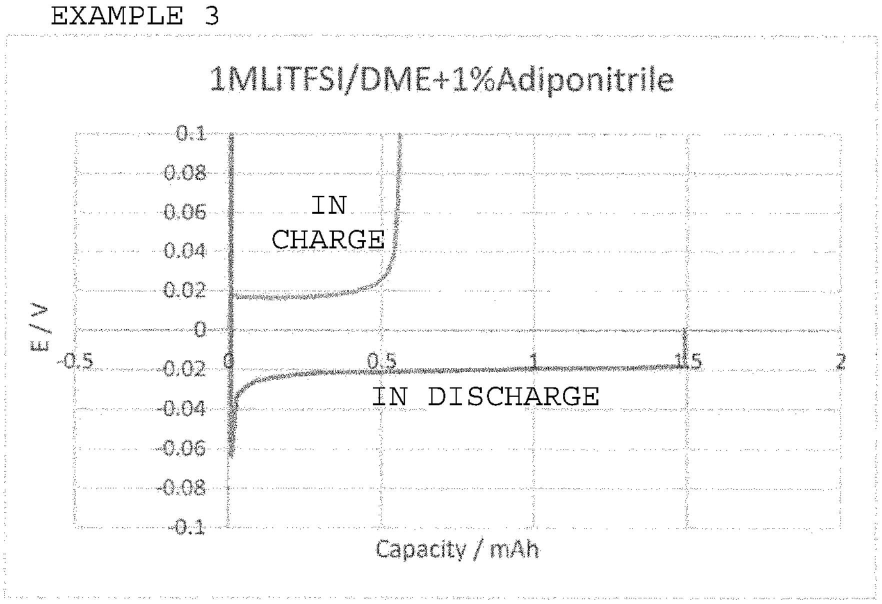
FIG. 6 is a graph showing an initial charge-discharge curve created in Example 3.

In the same manner as in Example 1 except that an adiponitrile (AdpN) was added as an additive so as to be 1 w/v %, an electrolytic solution was prepared, a Li half-cell was prepared, the electrochemical measurement was performed, and an initial charge-discharge curve (FIG. 6) was created. In FIG. 6, the peak voltage in the discharge was measured, and defined as an overvoltage.

Example 4

Figure 7:
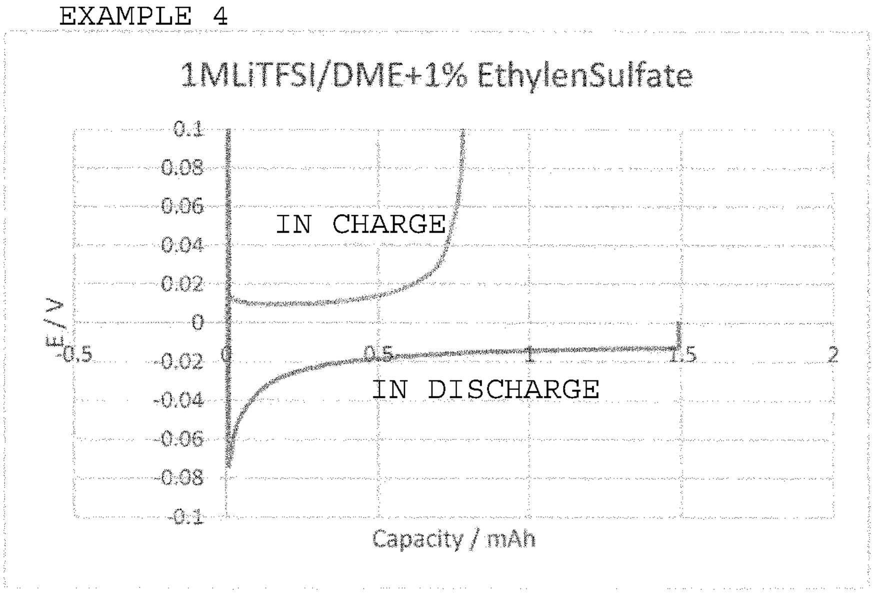
FIG. 7 is a graph showing an initial charge-discharge curve created in Example 4.

In the same manner as in Example 1 except that an ethylene sulfate (DTD) was added as an additive so as to be 1 w/v %, an electrolytic solution was prepared, a Li half-cell was prepared, the electrochemical measurement was performed, and an initial charge-discharge curve (FIG. 7) was created. In FIG. 7, the peak voltage in the discharge was measured, and defined as an overvoltage.

Example 5

Figure 8:
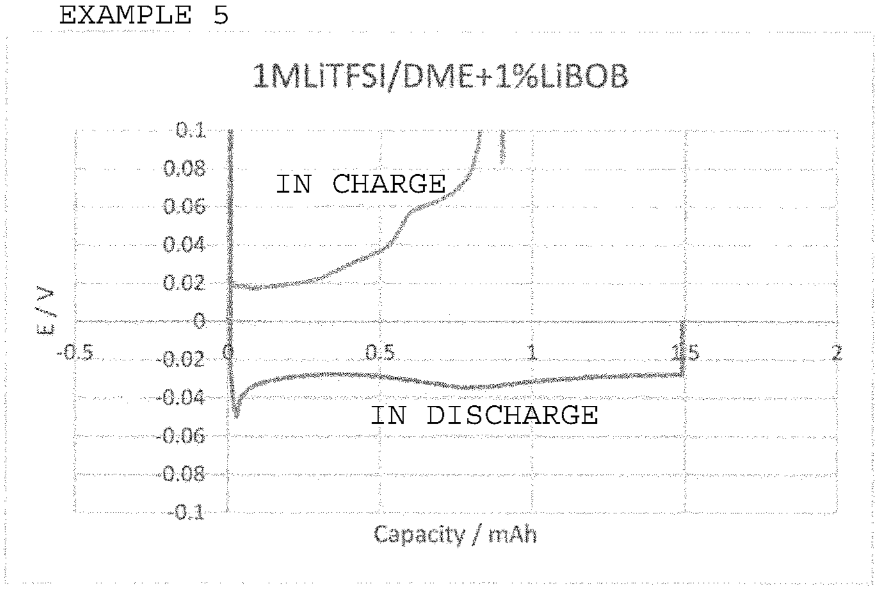
FIG. 8 is a graph showing an initial charge-discharge curve created in Example 5.

In the same manner as in Example 1 except that a lithium bis(oxalate)borate (LiBOB) was added as an additive so as to be 1 w/v %, an electrolytic solution was prepared, a Li half-cell was prepared, the electrochemical measurement was performed, and an initial charge-discharge curve (FIG. 8) was created. In FIG. 8, the peak voltage in the discharge was measured, and defined as an overvoltage.

Example 6

Figure 9:
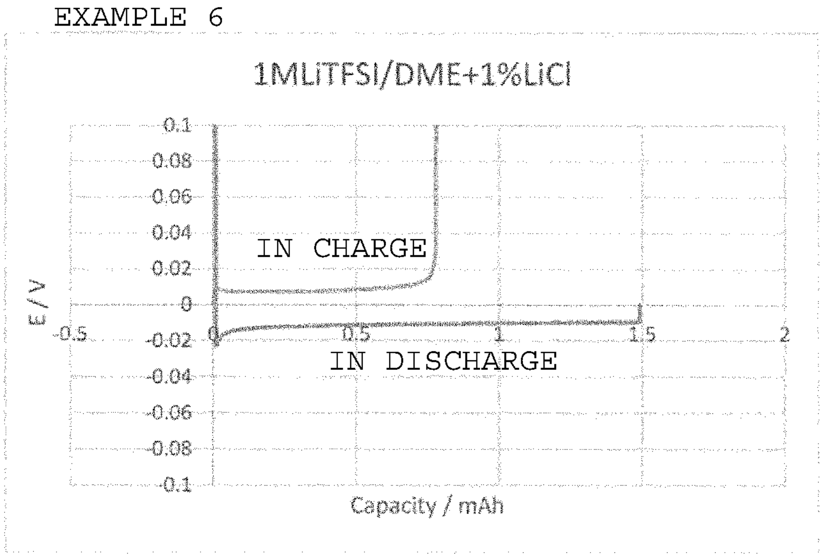
FIG. 9 is a graph showing an initial charge-discharge curve created in Example 6.

In the same manner as in Example 1 except that a lithium chloride (LiCl) was added as an additive so as to be 1 w/v %, an electrolytic solution was prepared, a Li half-cell was prepared, the electrochemical measurement was performed, and an initial charge-discharge curve (FIG. 9) was created. In FIG. 9, the peak voltage in the discharge was measured, and defined as an overvoltage.

Example 7

Figure 10:
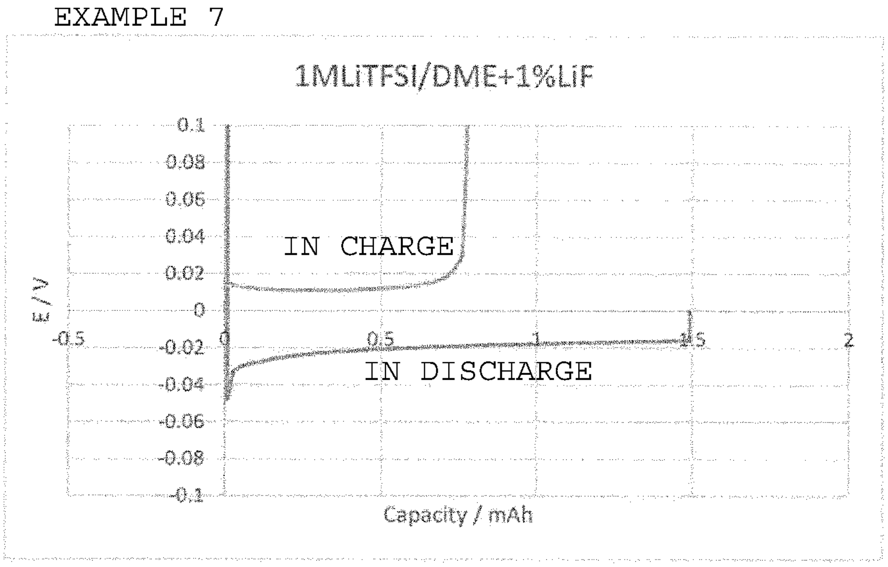
FIG. 10 is a graph showing an initial charge-discharge curve created in Example 7.

In the same manner as in Example 1 except that a lithium fluoride (LiF) was added as an additive so as to be 1 w/v %, an electrolytic solution was prepared, a Li half-cell was prepared, the electrochemical measurement was performed, and an initial charge-discharge curve (FIG. 10) was created. In FIG. 10, the peak voltage in the discharge was measured, and defined as an overvoltage.

Example 8

Figure 11:
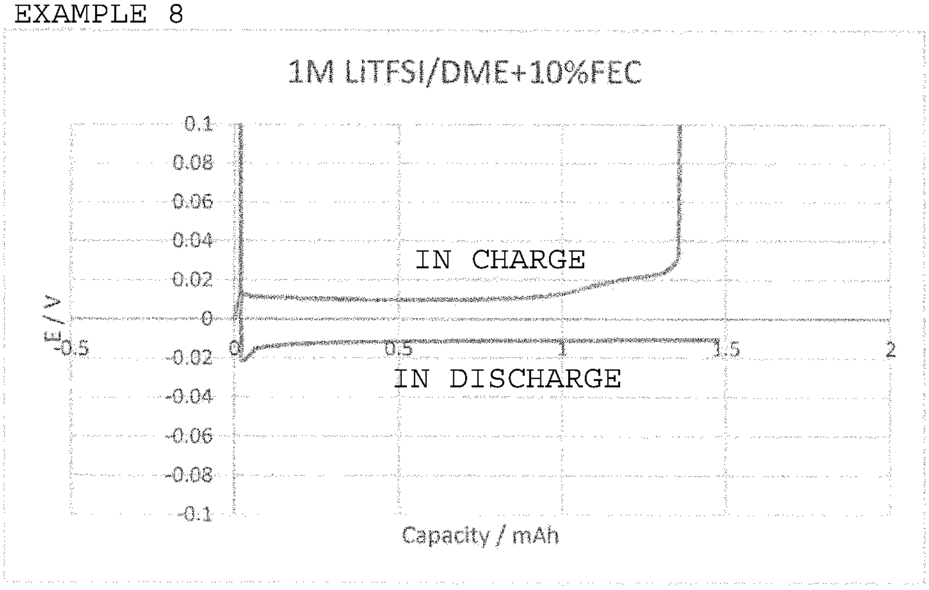
FIG. 11 is a graph showing an initial charge-discharge curve created in Example 8.

In the same manner as in Example 1 except that a fluoroethylene carbonate (FEC) was added as an additive so as to be 10 w/v %, an electrolytic solution was prepared, a Li half-cell was prepared, the electrochemical measurement was performed, and an initial charge-discharge curve (FIG. 11) was created. In FIG. 11, the peak voltage in the discharge was measured, and defined as an overvoltage.

Example 9

Figure 12:
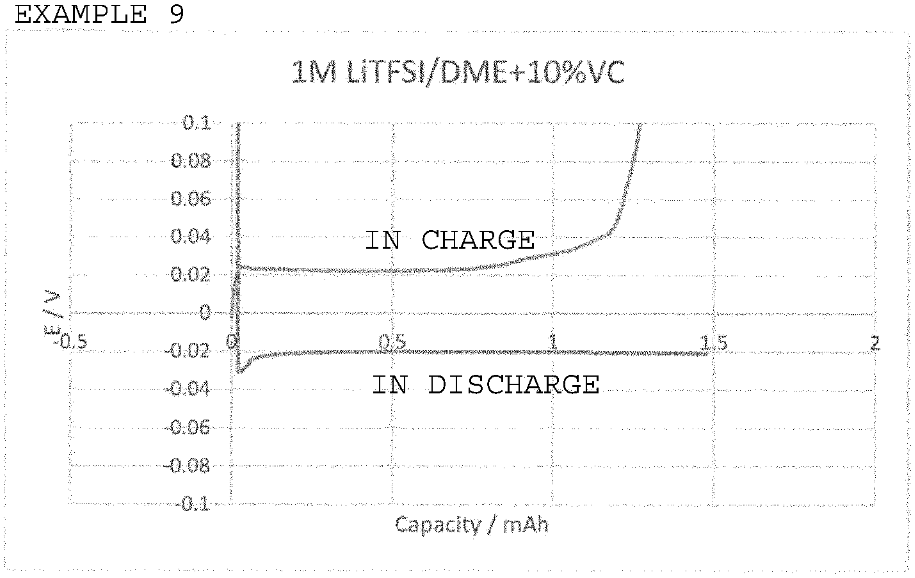
FIG. 12 is a graph showing an initial charge-discharge curve created in Example 9.

In the same manner as in Example 1 except that a vinylene carbonate (VC) was added as an additive so as to be 10 w/v %, an electrolytic solution was prepared, a Li half-cell was prepared, the electrochemical measurement was performed, and an initial charge-discharge curve (FIG. 12) was created. In FIG. 12, the peak voltage in the discharge was measured, and defined as an overvoltage.

Example 10

Figure 13:
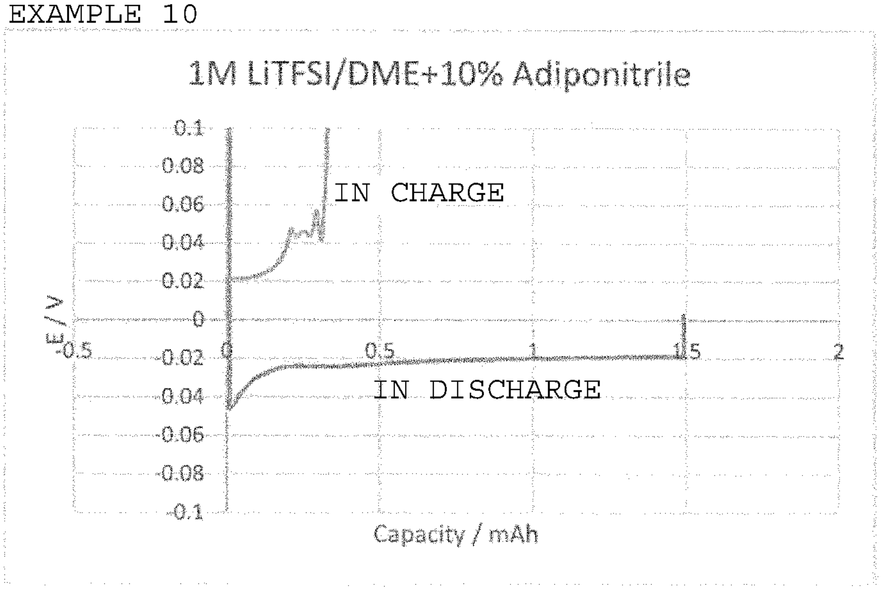
FIG. 13 is a graph showing an initial charge-discharge curve created in Example 10.

In the same manner as in Example 1 except that an adiponitrile (AdpN) was added as an additive so as to be 1 w/v %, an electrolytic solution was prepared, a Li half-cell was prepared, the electrochemical measurement was performed, and an initial charge-discharge curve (FIG. 13) was created. In FIG. 13, the peak voltage in the discharge was measured, and defined as an overvoltage.

Example 11

Figure 14:
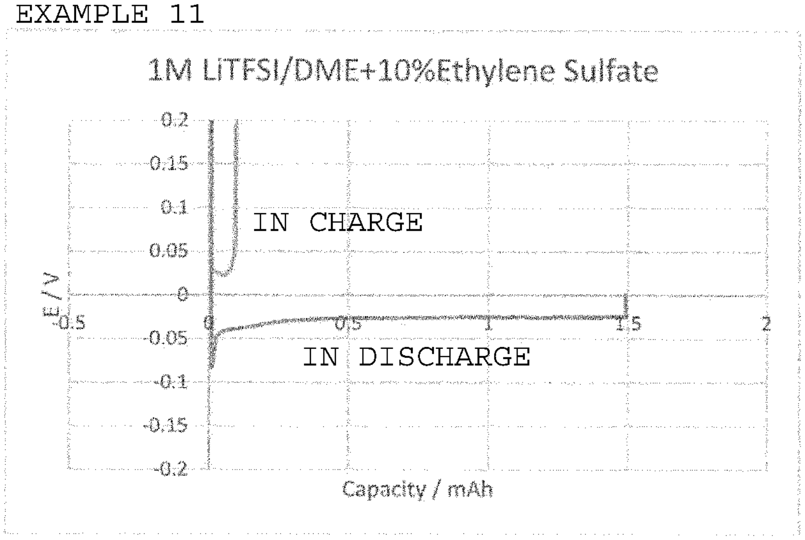
FIG. 14 is a graph showing an initial charge-discharge curve created in Example 11.

In the same manner as in Example 1 except that an ethylene sulfate (DTD) was added as an additive so as to be 10 w/v %, an electrolytic solution was prepared, a Li half-cell was prepared, the electrochemical measurement was performed, and an initial charge-discharge curve (FIG. 14) was created. In FIG. 14, the peak voltage in the discharge was measured, and defined as an overvoltage.

Example 12

Figure 15:
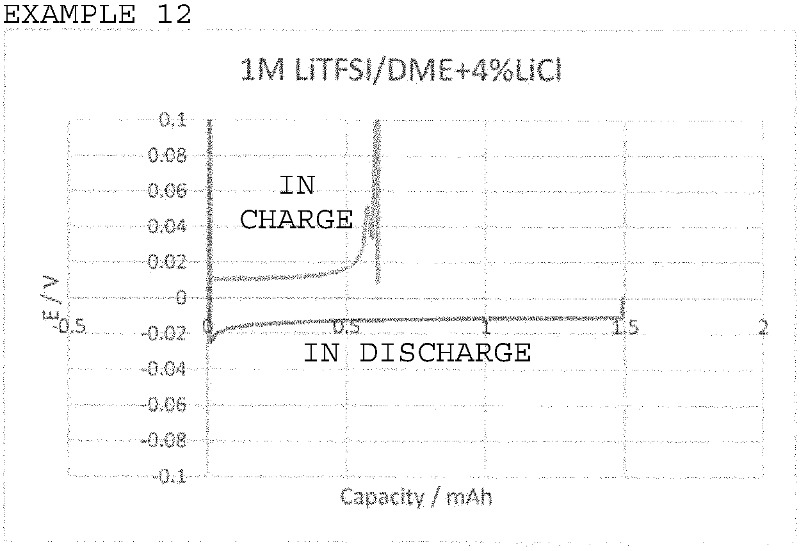
FIG. 15 is a graph showing an initial charge-discharge curve created in Example 12.

In the same manner as in Example 1 except that a lithium chloride (LiCl) was added as an additive so as to be 4 w/v %, an electrolytic solution was prepared, a Li half-cell was prepared, the electrochemical measurement was performed, and an initial charge-discharge curve (FIG. 15) was created. In FIG. 15, the peak voltage in the discharge was measured, and defined as an overvoltage.

Example 13

Figure 16:
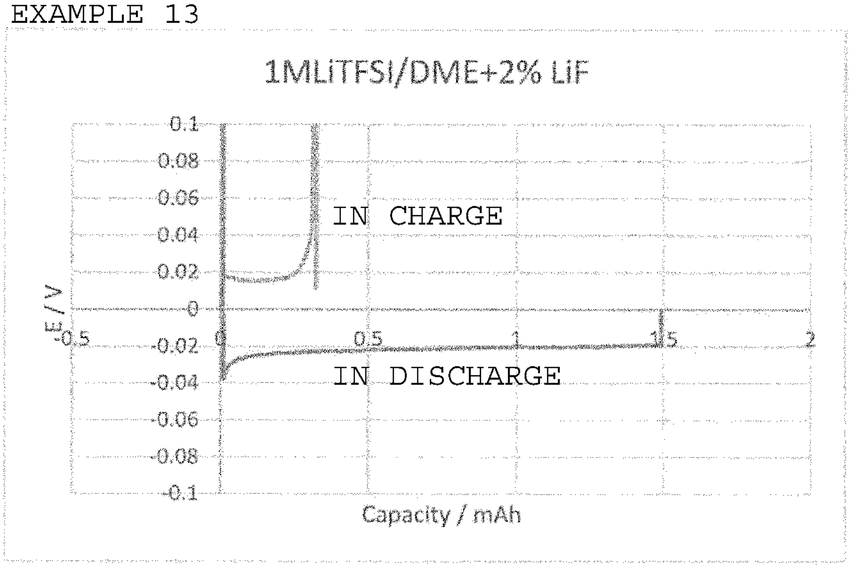
FIG. 16 is a graph showing an initial charge-discharge curve created in Example 13.

In the same manner as in Example 1 except that a lithium fluoride (LiF) was added as an additive so as to be 2 w/v %, an electrolytic solution was prepared, a Li half-cell was prepared, the electrochemical measurement was performed, and an initial charge-discharge curve (FIG. 16) was created. In FIG. 16, the peak voltage in the discharge was measured, and defined as an overvoltage.

Comparative Example 1

Figure 17:
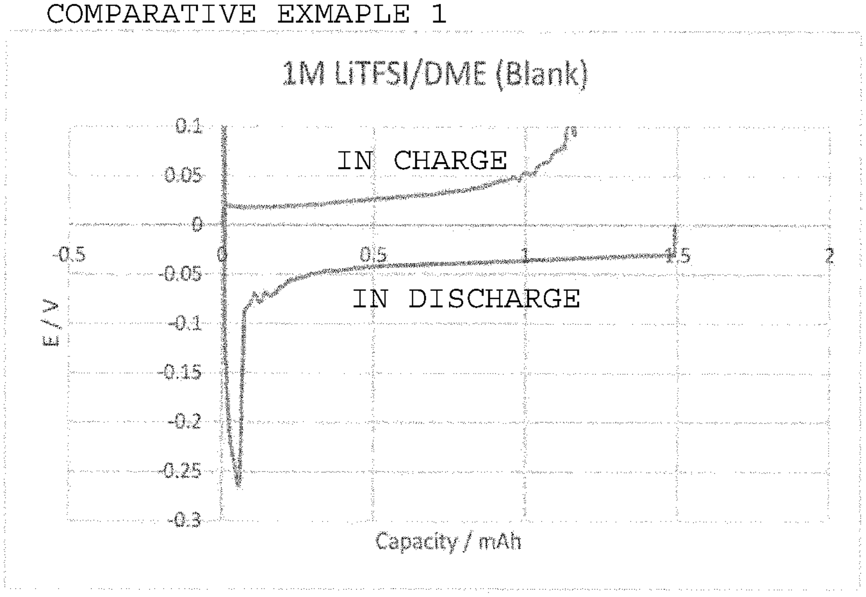
FIG. 17 is a graph showing an initial charge-discharge curve created in Comparative Example 1.

In the same manner as in Example 1 except that no additive was added, an electrolytic solution was prepared, a Li half-cell was prepared, the electrochemical measurement was performed, and an initial charge-discharge curve (FIG. 17) was created. In FIG. 17, the peak voltage in the discharge was measured, and defined as an overvoltage.

Comparative Example 2

Figure 18:
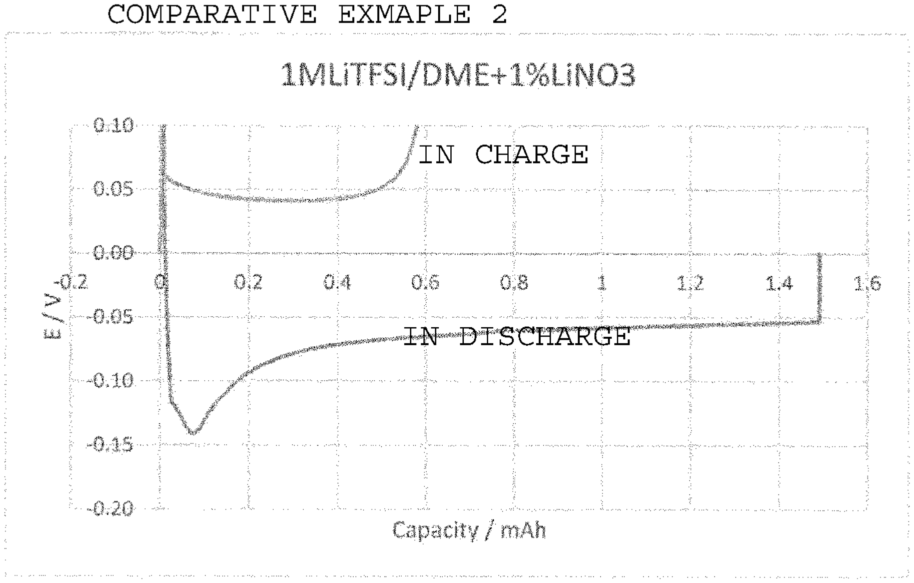
FIG. 18 is a graph showing an initial charge-discharge curve created in Comparative Example 2.

In the same manner as in Example 1 except that a lithium nitrate ($LiNO_3$) was added as an additive so as to be 1 w/v %, an electrolytic solution was prepared, a Li half-cell was prepared, the electrochemical measurement was performed, and an initial charge-discharge curve (FIG. 18) was created. In FIG. 18, the peak voltage in the discharge was measured, and defined as an overvoltage.

The overvoltage in each Example/Comparative Example is shown in the following table.

TABLE 3

| | Additive (w/v %) | Overvoltage (V) (Evaluation Result) |
|---|---|---|
| Example 1 | FEC (1) | −0.04 (◎) |
| Example 2 | VC (1) | −0.07 (Δ) |
| Example 3 | AdpN (1) | −0.065 (Δ) |
| Example 4 | DTD (1) | −0.075 (Δ) |
| Example 5 | LiBOB (1) | −0.05 (○) |
| Example 6 | LiCl (1) | −0.025 (◎) |
| Example 7 | LiF (1) | −0.05 (○) |
| Example 8 | FEC (10) | −0.022 (◎) |
| Example 9 | VC (10) | −0.03 (◎) |
| Example 10 | AdpN (10) | −0.046 (○) |
| Example 11 | DTD (10) | −0.08 (Δ) |
| Example 12 | LiCl (4) | −0.025 (◎) |
| Example 13 | LiF (2) | −0.038 (◎) |
| Comparative Example 1 | No (1) | −0.27 (X) |
| Comparative Example 2 | LiNO3 (1) | −0.14 (X) |

It has been observed that the magnitudes (i.e. absolute values) of the overvoltages in Examples 1 to 7 are observed smaller than the magnitudes (i.e. absolute values) of the overvoltages in Comparative Examples 1 to 2.

It has been observed that when the FEC, VC, LiCl or LiF is included to reach any content of 1 to 20 w/v % (particularly 1 to 10 w/v %), the overvoltage is suppressed at the best (⊙) level.

From the results mentioned above, it is determined that FEC and the LiCl are most preferred from the viewpoint of further suppressing the overvoltages.

[Experimental Example 2] (Evaluation of Cycle Characteristics)

Figure 19:
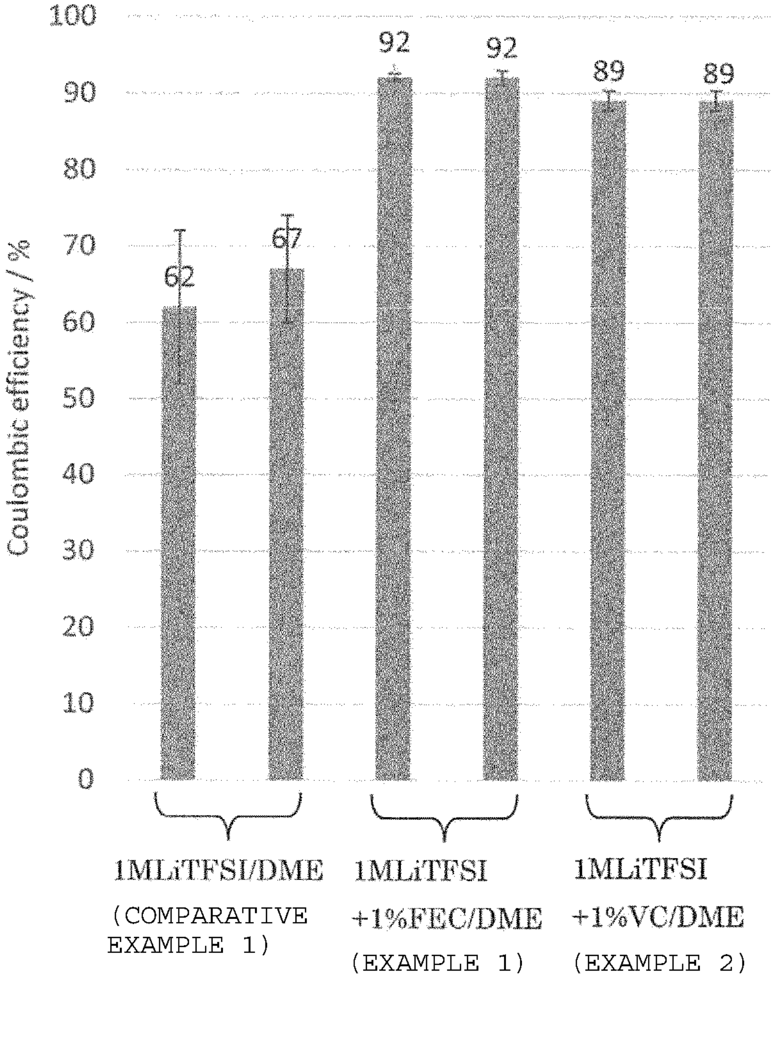
FIG. 19 is a graph showing coulombic efficiencies of various additives.

Cycle characteristics were evaluated with the use of the half-cells obtained in Examples 1 and 2 and Comparative Example 1. In FIG. 19, the coulombic efficiencies of the various additives were compared with n=2. The average coulombic efficiencies were average values for 10 to 50 cycles, and the S.D. values in that case were indicated by bars. It has been confirmed that the FEC and the VC have improvements in coulombic efficiency.

The clone efficiency was measured by the following method.

The discharge capacity of 1.5 mAh in the above-mentioned method of electrochemical measurement was referred to as Q1, and the charge capacity at the time of reaching 1.0 V by charge was referred to as Q2. The coulombic efficiency was defined by the following equation:

$$\text{coulombic Efficiency} = Q2/Q1 \times 100$$

INDUSTRIAL APPLICABILITY

The secondary battery according to the present application can be used in various fields in which battery use or electricity storage is assumed. By way of example only, the secondary battery according to the present application can be used in the field of electronics mounting. The secondary battery according to an embodiment of the present application can also be used in the fields of electricity, information, and communication in which mobile equipment, and the like are used (for example, electric and electronic equipment fields or mobile equipment fields including mobile phones, smartphones, notebook computers and digital cameras, activity meters, arm computers, electronic papers, and small electronic machines such as wearable devices, RFID tags, card type electronic money, and smartwatches), home and small industrial applications (for example, the fields of electric tools, golf carts, and home, nursing, and industrial robots), large industrial applications (for example, fields of forklift, elevator, and harbor crane), transportation system fields (field of, for example, hybrid automobiles, electric automobiles, buses, trains, power-assisted bicycles, and electric two-wheeled vehicles), power system applications (for example, fields such as various types of power generation, road conditioners, smart grids, and household power storage systems), medical applications (medical equipment fields such as earphone hearing aids), pharmaceutical applications (fields such as dosage management systems), IoT fields, space and deep sea applications (for example, fields such as a space probe and a research submarine), and the like.

DESCRIPTION OF REFERENCE SYMBOLS

1: Working electrode (negative electrode)
2: Counter electrode (positive electrode)
3: Separator It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising a positive electrode, a negative electrode, and an electrolytic solution, wherein the negative electrode is a metal lithium electrode, and the electrolytic solution comprises:

a sulfonyl group-containing lithium salt;

a glyme-based solvent; and one or more additives selected from the group consisting of compounds represented by a formula (I), a formula (II), a formula (III), a formula (IV), and a formula (V) and a lithium bis(oxalate) borate:

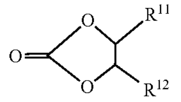

(I)

in the formula (I), $R^{11}$ and $R^{12}$ are each independently a hydrogen atom, a halogen atom, or a hydrocarbon group having 1 to 10 carbon atoms;

[Chemical Formula 2]

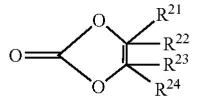

(II)

in the formula (II), $R^{21}$, $R^{22}$, $R^{23}$, and $R^{24}$ are each independently a hydrogen atom, a halogen atom, or a hydrocarbon group having 1 to 10 carbon atoms;

(III)

$$NC-(CH_2)_m-CN$$

in the formula (III), m is an integer of 1 or more and 10 or less;

(IV)

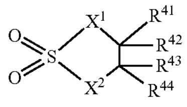

in the formula (IV), $R^{41}$, $R^{42}$, $R^{43}$, and $R^{44}$ are each independently a hydrogen atom, a halogen atom, or a hydrocarbon group having 1 to 10 carbon atoms; and $X^1$ and $X^2$ are each independently an oxygen atom or a methylene group; and $$LiRh \qquad (V)$$

in the formula (V), Rh is a halogen atom, wherein the electrolytic solution includes the glyme-based solvent at 50% by weight or more with respect to a total amount of the electrolytic solution, and wherein the electrolytic solution includes another solvent at 5% by weight or less with respect to a total amount of the electrolytic solution.

2. The secondary battery according to claim 1, wherein the electrolytic solution includes the additive at 0.1 w/v % or more and 20 w/v % or less.

3. The secondary battery according to claim 1, wherein the sulfonyl group-containing lithium salt is one or more compounds selected from the group consisting of a sulfonylimide-based lithium salt represented by a formula (S1) and a lithium sulfonate salt represented by a formula (S2):

(S1)

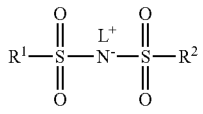

in the formula (S1), $R^1$ and $R^2$ are each independently a halogen atom or a halogen atom-containing hydrocarbon group having 1 to 10 carbon atoms; and (S2)

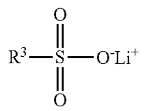

in the formula (S2), $R^3$ is a halogen atom or a halogen atom-containing hydrocarbon group having 1 to 10 carbon atoms.

4. The secondary battery according to claim 1, wherein the electrolytic solution contains the sulfonyl group-containing lithium salt at 0.1 mol/L or more and 10 mol/L or less.

5. The secondary battery according to claim 1, wherein the glyme-based solvent is a linear ether represented by a formula (G):

(G)

$$R'-(O-C_2H_4)_n-O-R''$$

in the formula (G), R' and R" are each independently a hydrocarbon group having 1 to 10 carbon atoms; and n is an integer of 1 or more and 10 or less.

6. The secondary battery according to claim 1, wherein the electrolytic solution includes the compound represented by the formula (I) alone as the additive at 1.5 w/v % or more and 15 w/v % or less.

7. The secondary battery according to claim 1, wherein the electrolytic solution includes the compound represented by the general formula (II) alone as the additive at 0.1 w/v % or more and 20 w/v % or less.

8. The secondary battery according to claim 1, wherein the electrolytic solution includes the compound represented by the formula (III) alone as the additive at 1.5 w/v % or more and 15 w/v % or less.

9. The secondary battery according to claim 1, wherein the electrolytic solution includes the lithium bis(oxalate) borate alone as the additive at 0.1 w/v % or more and 20 w/v % or less.

10. The secondary battery according to claim 1, wherein the electrolytic solution includes the compound represented by the formula (V) alone as the additive at 0.1 w/v % or more and 20 w/v % or less.

11. The secondary battery according to claim 1, wherein the secondary battery is a lithium ion secondary battery.

12. The secondary battery according to claim 1, wherein the positive electrode and the negative electrode are electrodes capable of occluding and releasing lithium ions.

13. The secondary battery according to claim 1, wherein the additive is the compound represented by the formula (V), and wherein the compound is LiCl or LiF.

14. The secondary battery according to claim 1, wherein the electrolytic solution includes the additive at 0.1 w/v % or more and 10 w/v % or less.

* * * * *